United States Patent
Chae et al.

(10) Patent No.: US 9,804,661 B2
(45) Date of Patent: Oct. 31, 2017

(54) APPARATUS AND METHOD FOR CONTROLLING POWER OF ELECTRONIC DEVICE

(71) Applicant: Samsung Electronics Co., Ltd., Gyeonggi-do (KR)

(72) Inventors: Sangwon Chae, Seoul (KR); Hyoungil Kim, Gyeonggi-do (KR); Jungeun Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 66 days.

(21) Appl. No.: 14/693,503

(22) Filed: Apr. 22, 2015

(65) Prior Publication Data
US 2015/0301587 A1    Oct. 22, 2015

(30) Foreign Application Priority Data

Apr. 22, 2014 (KR) .................. 10-2014-0047924

(51) Int. Cl.
G06F 1/32    (2006.01)

(52) U.S. Cl.
CPC ............ G06F 1/3265 (2013.01); G06F 1/324 (2013.01); Y02B 60/1217 (2013.01); Y02B 60/1242 (2013.01)

(58) Field of Classification Search
CPC ............................. G06F 1/3265; G06F 1/324
See application file for complete search history.

(56) References Cited

U.S. PATENT DOCUMENTS

| 5,623,647 | A  | * | 4/1997 | Maitra | ................... | G06F 1/206 713/501 |
| 6,289,399 | B1 | * | 9/2001 | Furuichi | ............... | G06F 1/3287 710/16 |
| 7,694,160 | B2 | * | 4/2010 | Esliger | .................. | G06F 1/3203 713/320 |
| 8,397,087 | B1 | * | 3/2013 | Gardner | .................. | G06F 1/329 713/300 |
| 8,488,500 | B2 | * | 7/2013 | Mukherjee | ........ | H04W 52/0216 370/311 |
| 2004/0133816 | A1 | * | 7/2004 | Miyairi | ................. | G06F 1/3203 713/300 |
| 2005/0044202 | A1 | * | 2/2005 | Shirota | ................. | G06F 1/3209 709/223 |
| 2005/0102544 | A1 | * | 5/2005 | Brewer | ................. | G06F 1/3203 713/320 |

(Continued)

FOREIGN PATENT DOCUMENTS

JP    2012063917    3/2012

*Primary Examiner* — Thomas Lee
*Assistant Examiner* — Gary Collins
(74) *Attorney, Agent, or Firm* — The Farrell Law Firm, P.C.

(57) ABSTRACT

A power control method of an electronic device is provided. The electronic device transmits power change information containing a power control value of an application to another electronic device, and receives and stores power control information about the application transmitted from the another electronic device. If a power level of the electronic device is lower than a predetermined power change level when the application is executed, the electronic device executes the application with power control data of the application in the power control information stored in the electronic device.

26 Claims, 11 Drawing Sheets

(56) References Cited

U.S. PATENT DOCUMENTS

| | | | |
|---|---|---|---|
| 2005/0268141 A1* | 12/2005 | Alben | G06F 1/10 713/500 |
| 2007/0192641 A1* | 8/2007 | Nagendra | G06F 1/3203 713/320 |
| 2008/0052545 A1* | 2/2008 | Finkelstein | G06F 1/3228 713/300 |
| 2008/0189562 A1* | 8/2008 | McBrearty | G06F 1/206 713/300 |
| 2008/0200220 A1* | 8/2008 | Jackson | G06F 1/3203 455/574 |
| 2008/0209248 A1* | 8/2008 | Priel | G06F 1/3225 713/340 |
| 2009/0023482 A1* | 1/2009 | Koura | G09G 3/20 455/574 |
| 2010/0313203 A1* | 12/2010 | Dawson | G06F 1/3203 718/102 |
| 2011/0109624 A1* | 5/2011 | Greenberg | G06F 1/3203 345/419 |
| 2011/0167286 A1* | 7/2011 | Varadarajan | G06F 1/3287 713/323 |
| 2011/0239010 A1* | 9/2011 | Jain | G06F 1/3209 713/310 |
| 2012/0110351 A1* | 5/2012 | Raju | G06F 1/3203 713/300 |
| 2012/0110360 A1* | 5/2012 | Lin | G06F 1/3215 713/324 |
| 2012/0210325 A1* | 8/2012 | de Lind van Wijngaarden | H04W 52/0258 718/103 |
| 2012/0233480 A1 | 9/2012 | Tanaka | |
| 2012/0239949 A1* | 9/2012 | Kalyanasundaram | G06F 1/3212 713/320 |
| 2012/0290865 A1* | 11/2012 | Kansal | G06F 1/3203 713/340 |
| 2012/0317266 A1* | 12/2012 | Abbott | G06Q 30/0278 709/224 |
| 2013/0080807 A1 | 3/2013 | Theocharous et al. | |
| 2013/0262890 A1* | 10/2013 | Marshall | G06F 1/3212 713/320 |
| 2014/0128021 A1* | 5/2014 | Walker | H04W 52/0212 455/405 |
| 2014/0317427 A1* | 10/2014 | Hill | G06F 1/3206 713/322 |
| 2014/0359324 A1* | 12/2014 | Park | G09G 5/00 713/320 |
| 2014/0365787 A1* | 12/2014 | Sagar | G06F 1/3287 713/300 |
| 2015/0185804 A1* | 7/2015 | Jun | G06F 1/3209 713/310 |
| 2015/0208354 A1* | 7/2015 | Lokhande | H04W 52/0258 455/574 |

* cited by examiner

APPARATUS AND METHOD FOR CONTROLLING POWER OF ELECTRONIC DEVICE

PRIORITY

This application claims priority under 35 U.S.C. §119(a) to a Korean Patent Application filed on Apr. 22, 2014, in the Korean Intellectual Property Office and assigned Serial No. 10-2014-0047924, the entire content of which is incorporated herein by reference.

BACKGROUND

1. Field of the Invention

The present invention generally relates to an apparatus and method for controlling display power depending on applications at an electronic device.

2. Description of the Related Art

Normally, an electronic device using a battery has various forms of saving electric power consumed therein. For example, an electronic device having a prediction unit for predicting whether power saving is available may have a function to notify a power saving option. In this case, a user receiving such a notification may select whether to use a power saving mode.

Another power saving technique is to monitor the quantity of currently consumed power and then to differently supply power according to circumstances. In this case, a current circumstance may be analyzed through a sensor, and thus power consumption may be changed dynamically depending on a user status.

Even in the same circumstance, an electronic device may have different amounts of power consumption depending on an application used. However, there is no solution of operating an application with low power according to such circumstances.

SUMMARY

The present invention has been made to solve at least the above-mentioned problems and/or disadvantages and to provide at least the advantages described below.

Accordingly, an aspect of the present invention is to provide an apparatus and method for controlling power consumption depending on applications by collecting statistics of power consumption of users using the same application and then by setting the most suitable frame per second (FPS) for each application.

According to an aspect of the present invention, a power control method of an electronic device is provided, which includes transmitting power change information containing a power control value of an application to another electronic device; receiving and storing power control information about the application transmitted from the another electronic device; and if a power level of the electronic device is lower than a predetermined power change level when the application is executed, executing the application with power control data of the application included in the power control information stored in the electronic device.

According to another aspect of the present invention, a method for processing power control information for power control of a first electronic device at a second electronic device is provided, which includes collecting power change information about applications transmitted from the first electronic device, the power change information containing application names and power control values; calculating a representative value of the power control values for each of the applications from the collected power change information; creating power control information by defining the calculated representative value as power control data of each of the applications; and transmitting the power control information to the first electronic device.

According to another aspect of the present invention, an electronic device is provided, which includes a communication unit; a memory unit; a display unit configured to display an execution screen of an application; and a control unit configured to: generate power change information containing a power control value of an application, control the communication unit to transmit power change information to another electronic device, and to receive power control information about the application from the another electronic device, control the memory unit to store the power control information about the application, and execute the application with a power control data of the application included in the power control information if a power level of the electronic device is lower than a predetermined power change level.

According to another aspect of the present invention, a second electronic device for controlling power of a first electronic device is provided, which includes a collecting unit configured to collect power change information about applications transmitted from the first electronic device, the power change information containing application names and power control values; a representative value calculating unit configured to calculate a representative value of the power control values for each of the applications from the collected power change information; a power determining unit configured to create power control information by defining the calculated representative value as power control data of each of the applications; and a communication unit configured to transmit the power control information to the first electronic device.

According to another aspect of the present invention, a non-transitory computer-readable storage medium recording thereon a program for executing operations is provided. The operations include transmitting power change information containing a power control value of an application to another electronic device; receiving and storing power control information about the application transmitted from the another electronic device; and if a power level of the electronic device is lower than a predetermined power change level when the application is executed, executing the application with power control data of the application included in the power control information stored in the electronic device.

BRIEF DESCRIPTION OF THE DRAWINGS

The above and other aspects, features, and advantages of certain embodiments of the present invention will be more apparent from the following detailed description, taken in conjunction with the accompanying drawings, in which.

DETAILED DESCRIPTION OF EMBODIMENTS OF THE PRESENT INVENTION

Figure 1:
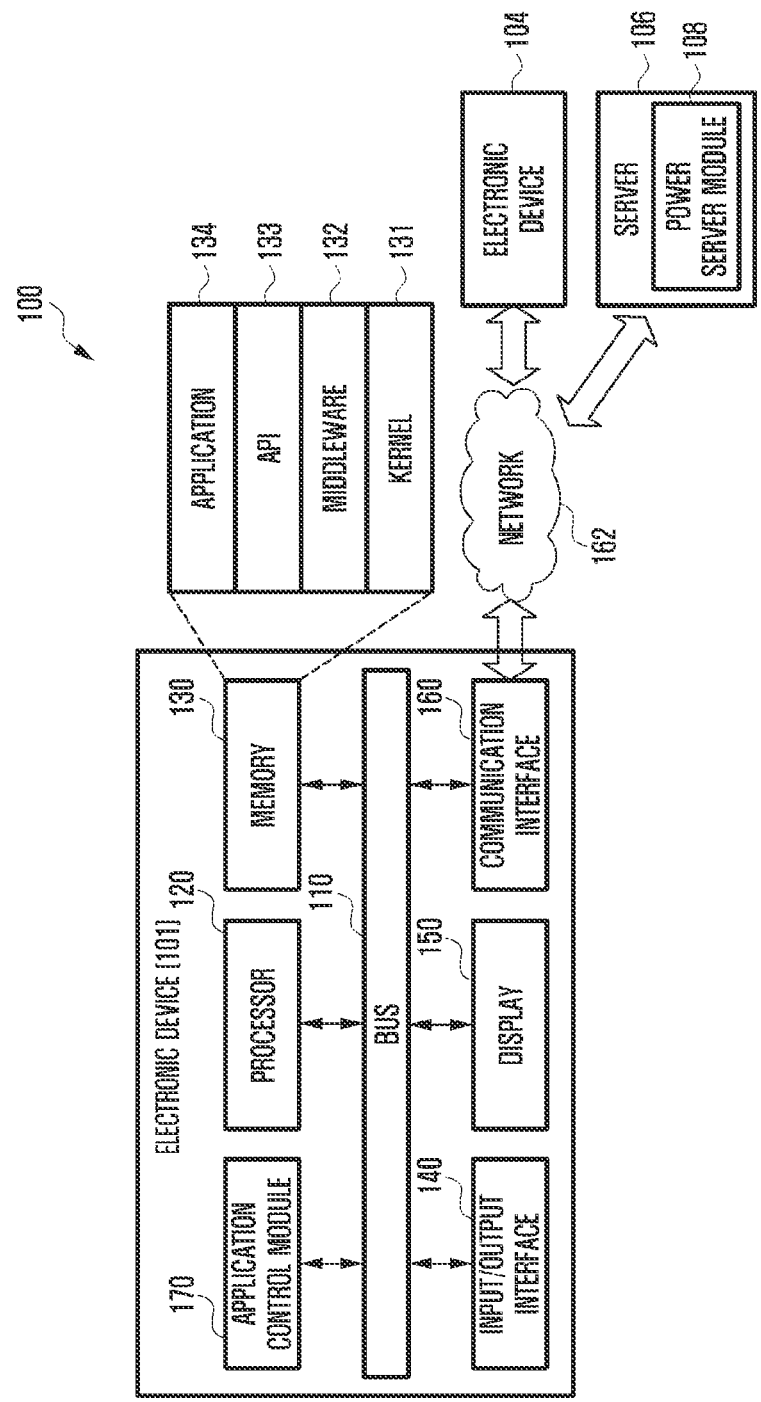
FIG. 1 is a diagram illustrating a network environment including an electronic device in accordance with an embodiment of the present invention.

Hereinafter, certain embodiments of the present invention are described in detail with reference to the accompanying drawings. While the present invention may be embodied in many different forms, specific embodiments of the present invention are shown in drawings and are described herein in detail, with the understanding that the present disclosure is to be considered as an example illustrating the principles of the present invention and is not intended to limit the present invention to the specific embodiments illustrated. The same reference numbers are used throughout the drawings to refer to the same or like parts.

The expression "comprising" or "may comprise" used in the present disclosure indicates the presence of a corresponding function, operation, or element and does not limit additional at least one function, operation, or element. Further, in the present disclosure, the term "comprise" or "have" indicates the presence of a characteristic, numeral, step, operation, element, component, or combination thereof described in the specification and does not exclude presence or addition of at least one other characteristic, numeral, step, operation, element, component, or combination thereof.

In the present disclosure, the expression "or" includes any combination or the entire combination of together listed words. For example, "A or B" may include A, B, or A and B.

The expressions "first" and "second" in the present disclosure may represent various elements of the present invention, but do not limit corresponding elements. For example, the expressions do not limit order and/or importance of corresponding elements. The expressions may be used for distinguishing one element from another element. For example, both a first user device and a second user device are user devices and represent different user devices. For example, a first constituent element may be referred to as a second constituent element without deviating from the scope of the present invention, and similarly, a second constituent element may be referred to as a first constituent element.

When it is described that an element is "coupled" to another element, the element may be "directly coupled" to the other element or "electrically coupled" to the other element through a third element. However, when it is described that an element is "directly coupled" to another element, no element may exist between the element and the other element.

The term "module" used in embodiments of the present invention may refer to, for example, a "unit" including one of hardware, software, and firmware, or a combination of two or more thereof. The term "module" may be interchangeable with a term such as a unit, a logic, a logical block, a component, or a circuit. The "module" may be a minimum unit of an integrated component or a part thereof. The "module" may be a minimum unit for performing one or more functions or a part thereof. The "module" may be mechanically or electronically implemented. For example, the "module" according to the present invention may include at least one of an Application-Specific Integrated Circuit (ASIC) chip, a Field-Programmable Gate Arrays (FPGA), and a programmable-logic device for performing operations which have been known or are to be developed.

Terms used in the present disclosure are not intended to limit the present invention but to illustrate certain embodiments of the present invention. When used in a description of the present invention and the appended claims, a singular form includes a plurality of forms unless it is explicitly differently represented.

Unless differently defined, entire terms including a technical term and a scientific term used herein have the same meaning as a meaning that may be generally understood by a person of ordinary skill in the art. It should be understood that generally using terms defined in a dictionary have a meaning corresponding to that of a context of related technology and are not intended to have an ideal or excessively formal meaning unless explicitly defined.

According to an embodiment of the present invention, an electronic device may be a device that involves a communication function. For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, an electronic appcessory, or a smart watch).

According to an embodiment of the present invention, an electronic device may be a smart home appliance that involves a communication function. For example, an electronic device may be a TV, a Digital Video Disk (DVD) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to an embodiment of the present invention, an electronic device may be a medical device (e.g., Magnetic Resonance Angiography (MRA), Magnetic Resonance Imaging (MRI), Computed Tomography (CT), ultrasonography, etc.), a navigation device, a Global Positioning System (GPS) receiver, an Event Data Recorder (EDR), a Flight Data Recorder (FDR), a car infotainment device, electronic equipment for ship (e.g., a marine navigation system, a gyrocompass, etc.), avionics, security equipment, or an industrial or home robot.

According to an embodiment of the present invention, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. As well understood by those skilled in the art, the above-mentioned electronic devices are only examples and not to be considered as a limitation of the present invention.

Hereinafter, an electronic device according to various embodiments will be described with reference to the accompanying drawings. The term "user" to be used herein may refer to a person or machine (e.g., an artificial intelligence apparatus or system) using an electronic device.

FIG. 1 is a block diagram illustrating a network environment 100 including therein an electronic device 101 in accordance with an embodiment of the present invention. Referring to FIG. 1, the electronic device 101 includes, but is not limited to, a bus 110, a processor 120, a memory 130, an input/output interface 140, a display 150, a communication interface 160, and an application control module 170.

The bus 110 is a circuit designed for connecting the above-discussed elements and communicating data (e.g., a control message) between such elements.

The processor 120 receives commands from the other elements (e.g., the memory 130, the input/output interface 140, the display 150, the communication interface 160, or the application control module 170, etc.) through the bus 110, interprets the received commands, and performs the arithmetic or data processing based on the interpreted commands.

The memory 130 stores therein commands or data received from or created at the processor 120 or other elements (e.g., the input/output interface 140, the display 150, the communication interface 160, or the application control module 170, etc.). The memory 130 may include programming modules such as a kernel 131, a middleware 132, an application programming interface (API) 133, and an application 134. Each of the programming modules may be composed of software, firmware, hardware, and any combination thereof.

The kernel 131 controls or manages system resources (e.g., the bus 110, the processor 120, or the memory 130, etc.) used for performing operations or functions of the other programming modules, e.g., the middleware 132, the API 133, or the application 134. Additionally, the kernel 131 offers an interface that allows the middleware 132, the API 133 or the application 134 to access, control or manage individual elements of the electronic device 101.

The middleware 132 performs intermediation by which the API 133 or the application 134 communicates with the kernel 131 to transmit or receive data. Additionally, in connection with task requests received from the applications 134, the middleware 132 performs a control (e.g., scheduling or load balancing) for the task request by using technique such as assigning the priority for using a system resource of the electronic device 101 (e.g., the bus 110, the processor 120, or the memory 130, etc.) to at least one of the applications 134.

The API 133, which is an interface for allowing the application 134 to control a function provided by the kernel 131 or the middleware 132, may include, for example, at least one interface or function (e.g., a command) for file control, window control, image processing, text control, and the like.

According to an embodiment of the present invention, the application 134 may include an short message service (SMS)/multimedia messaging service (MMS) application, an email application, a calendar application, an alarm application, a health care application (e.g., an application for measuring quantity of motion or blood sugar), an environment information application (e.g., an application for offering information about atmospheric pressure, humidity, or temperature, etc.), and the like. Alternatively, the application 134 may be an application associated with an exchange of information between the electronic device 101 and any external electronic device (e.g., an external electronic device 104). This type application may include a notification relay application for delivering specific information to an external electronic device, or a device management application for managing an external electronic device.

For example, the notification relay application may include a function to deliver notification information created at any other application of the electronic device 101 (e.g., the SMS/MMS application, the email application, the health care application, or the environment information application, etc.) to an external electronic device 104. Alternatively, the notification relay application may receive notification information from an external electronic device 104 and offer it to a user. The device management application may manage (e.g., install, remove or update) a certain function (a turn-on/turn-off of an external electronic device (or some components thereof), or an adjustment of brightness (or resolution) of a display) of any external electronic device 104 communicating with the electronic device 101, a certain application operating at such an external electronic device, or a certain service (e.g., a call service or a message service) offered by such an external electronic device.

According to an embodiment of the present invention, the application 134 may include a specific application specified depending on attributes (e.g., a type) of an external electronic device 104. For example, in case an external electronic device is an MP3 player, the application 134 may include a specific application associated with a play of music. As another example, in case an external electronic device is a portable medical device, the application 134 may include a specific application associated with a health care. In an embodiment of the present invention, the application 134 may include at least one of an application assigned to the electronic device 101 or an application received from an external electronic device (e.g., the server 106 or the electronic device 104).

The input/output interface 140 delivers commands or data, entered by a user through an input/output unit (e.g., a sensor, a keyboard, or a touch screen), to the processor 120, the memory 130, the communication interface 160, or the application control module 170 via the bus 110. For example, the input/output interface 140 may offer data about a user's touch, entered through the touch screen, to the processor 120. Also, through the input/output unit (e.g., a speaker or a display), the input/output interface 140 may output commands or data, received from the processor 120, the memory 130, the communication interface 160, or the application control module 170 via the bus 110. For example, the input/output interface 140 may output voice data, processed through the processor 120, to a user through the speaker.

The display 150 displays thereon various kinds of information (e.g., multimedia data, text data, etc.) to a user.

The communication interface 160 performs communication between the electronic device 101 and the electronic device 104 or the server 106. For example, the communication interface 160 may communicate with any external device by being connected with a network 162 through a wired or wireless communication. A wireless communication may include, but is not limited to, at least one of Wireless Fidelity (WiFi), Bluetooth (BT), Near Field Communication (NFC), Global Positioning System (GPS), or a cellular communication (e.g., Long Term Evolution (LTE), LTE Advanced (LTE-A), Code Division Multiple Access (CDMA), Wideband CDMA (WCDMA), Universal Mobile Telecommunications System (UMTS), Wireless Broadband (WiBro), or Global System for Mobile Communication (GSM), etc.). A wired communication may include, but is not limited to, at least one of Universal Serial Bus (USB), High Definition Multimedia Interface (HDMI), Recommended Standard 232 (RS-232), or Plain Old Telephone Service (POTS).

According to an embodiment of the present invention, the network 162 may be a communication network, which may include at least one of a computer network, an internet, an internet of things, or a telephone network. According to an embodiment of the present invention, a protocol (e.g., transport layer protocol, data link layer protocol, or physical layer protocol) for a communication between the electronic device 101 and any external device may be supported by at least one of the application 134, the API 133, the middleware 132, the kernel 131, or the communication interface 160.

The application control module 170 processes at least part of information obtained from the other elements (e.g., the processor 120, the memory 130, the input/output interface 140, or the communication interface 160, etc.) and then offers it to a user in various ways. For example, the application control module 170 may recognize information about access components equipped in the electronic device 101, store such information in the memory 130, and execute the application 134 on the basis of such information. Additional information about the application control module 170 will be offered through FIG. 2 discussed below.

Figure 2:
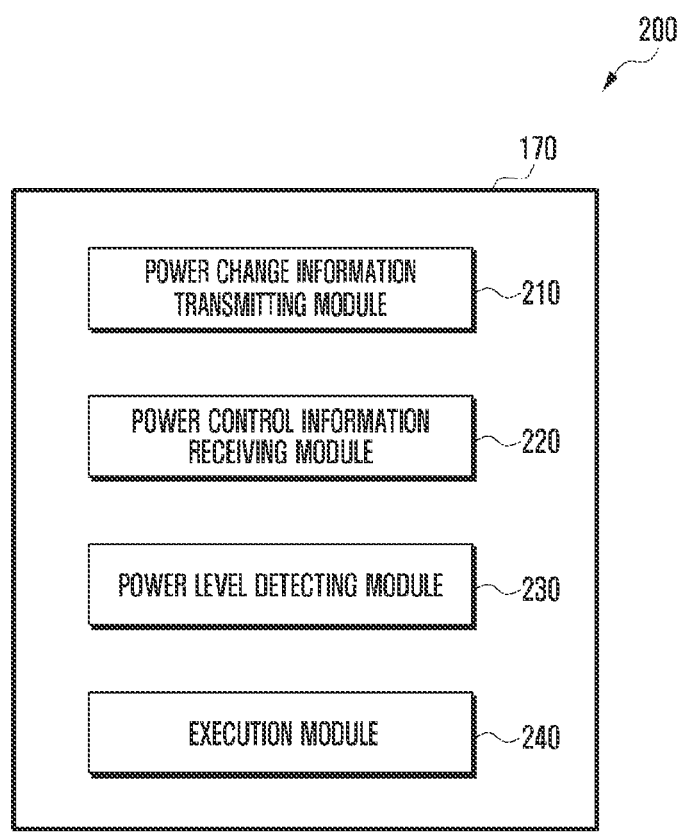
FIG. 2 is a block diagram illustrating an application control module of an electronic device in accordance with an embodiment of the present invention.

FIG. 2 is a block diagram 200 illustrating the application control module 170 of an electronic device (e.g., the electronic device 101) in accordance with an embodiment of the present invention. Referring to FIG. 2, the application control module 170 includes a power change information transmitting module 210, a power control information receiving module 220, a power level detecting module 230, and an execution module 240.

The power change information transmitting module 210 analyzes whether a power control value of a running application is changed. If any power control value of an application is changed, the power change information transmitting module 210 transmits power change information having the power control value to the server 106. The power change information may include application names and power change values. Additionally, the power change information may include screen display data (e.g., a frame per second (FPS)) of an application running at the electronic device and screen display control data (e.g., an operating dock of a graphic processing unit (GPU), a control unit, or the like).

The power control information receiving module 220 receives power control information about each application from the server 106 and stores the received information in the memory 130. The power control information may be created at a power server module 108 (see FIG. 1) of the server 106.

Specifically, the power server module 108 collects power change information (e.g., application names, power change values, etc.) of applications transmitted from the electronic devices. Then, using the collected power change information, the power server module 108 creates power control information by averaging the power control values of each application and then setting the averaged power control value as power control data of a corresponding application.

Additionally, the power change information may further include device types (e.g., a mobile phone, a smart phone, a tablet, a laptop computer, etc. having different values of power consumption depending on display sizes and displayed applications). Also, the power server module 108 may create the power control information of applications according to device types and then transmit the power control information to the electronic devices.

The power control information receiving module 220 checks the device type in the received power control data of each application, selects the specific power control data corresponding to its own device type, and stores the selected data in the memory 130.

The power level detecting module 230 detects a power level of the device when each application is executed.

The execution module 240 controls the execution of the application, based on the device power level detected by the power level detecting module 230. If the detected device power level is lower than a predefined power level, the execution module 240 controls the execution of the application by retrieving the power control data of the corresponding application from the memory 130.

In an embodiment of the present invention, a power change level may be a global power level which is lower than a predefined device power level, or a local power level which is set by a user. The power level detecting module 230 may analyze an execution mode when an application is executed. If the execution mode is an automatic mode, the execution module 240 compares a power level of the device with a global power level. If the device power level is lower than the global power level, the execution module 240 executes an application using power control data of the application. If the device power level is not lower than the global power level, the execution module 240 controls the execution of an application by considering the device power level as a normal power level. If the execution mode is a manual mode, the execution module 240 compares a power level of the device with a local power level. If the device power level is lower than the local power level, the execution module 240 executes an application using power control data of the application. If the device power level is not lower than the local power level, the execution module 240 controls the execution of an application by considering the device power level as a normal power level.

According to an embodiment of the present invention, a power control method which allows the electronic device to adjust power consumption according to each application is provided. In this method, the electronic devices may transmit information about power consumption for each application to the server, and the server may collect such information, define optimal power control data for each application, and deliver the defined data to the respective electronic devices. Additionally, if any particular condition for using power control data is satisfied when a specific application is executed, the electronic device may retrieve power control data of the application from stored data and control a power level of the application on the basis of the retrieved data. The power control data is used to control a screen display of an application, for example, to control a frame rate (i.e., FPS), an operating clock of the control unit (e.g., the application processor), or an operating clock of the GPU. Also, the particular condition for using the power control data may be determined according to a charged amount of device power (e.g., battery power). For example, the power change level may be a predetermined global power level in an automatic mode or a local power level set by a user. The electronic device analyzing a mode may determine a device power level to be a power change level when it is lower than a global power level in case of an automatic mode or when it is lower than a local power level in case of a manual mode.

The power control method may perform different power control depending on applications, thus reducing the whole power consumption of the electronic device. Also, the power control method based on each application may be always performed in a normal mode or automatically performed when a power saving mode is triggered at the electronic device.

Figure 3:
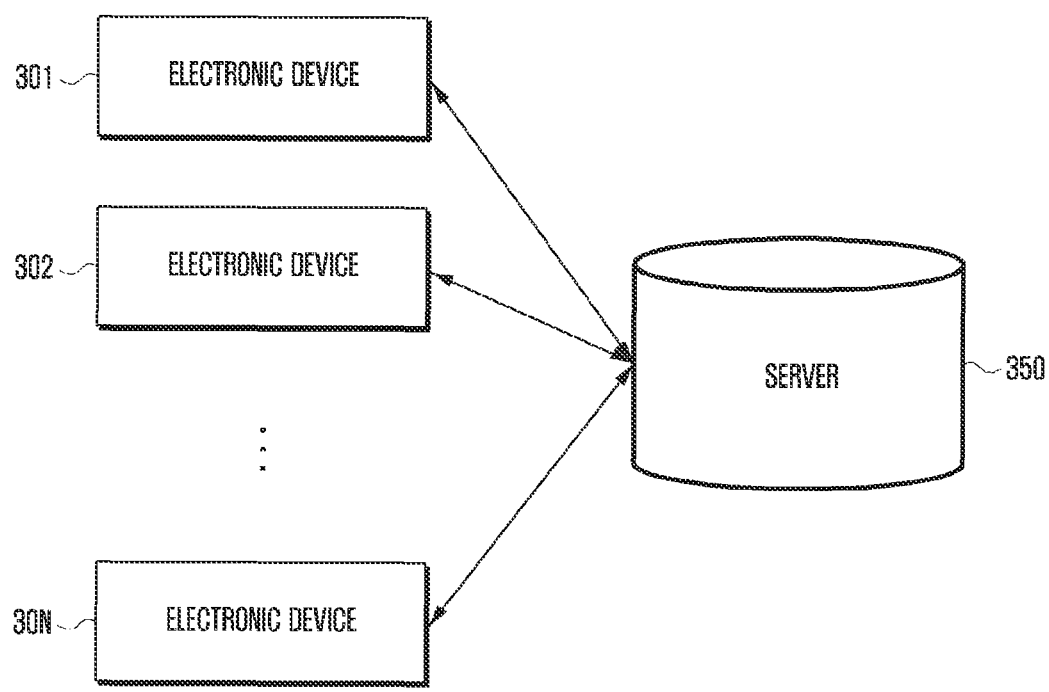
FIG. 3 is a schematic diagram illustrating a correlation between a server and electronic devices for power control depending on applications in accordance with an embodiment of the present invention.

FIG. 3 is a schematic diagram illustrating a correlation between a server and electronic devices for a power control depending on applications in accordance with an embodiment of the present invention.

Referring to FIG. 3, if the operating power of a certain application, which is installed in each of electronic device 301, 302, . . . , and 30N, is changed, each electronic device 301, 302, . . . , or 30N transmits power change information (e.g., an application name, a device type, a current device power or battery voltage, a power control value, etc.) about the application to a server 350. The server 350 collects and averages such power change information about the application received from the electronic devices 301, 302, . . . , and 30N and thereby creates power control information for the application of each electronic device 301, 302, . . . , or 30N. If the power change information contains a device type, the server 350 may create power control information for each device type. In this case, the power control information may have a mapping relation between the application and power control data for each electronic device, which is sweet spot power data of the application. The sweet spot may be power control data determining a display of an execution screen of an application. For example, the sweet spot may be a value for adjusting the FPS which is the frequency unit of redrawing a frame at a display. Additionally, the device type may be identified depending on a display size and power consumption of the electronic device. For example, compared with a tablet, a mobile phone has a smaller-sized display and lower power consumption when the execution screen of an application is displayed. That is, display sizes of different mobile devices may vary according to device types. Also, power required for displaying the execution screen of the same application may vary according to hardware characteristics. Therefore, the server 350 may create power control information depending on device types (e.g., a model name of device).

Additionally, the server 350 transmits the power control information including the power control data created for the application for each device to the electronic devices 301, 302, . . . , and 30N. The server 350 may transmit the power control information to the respective electronic devices 301, 302, . . . , and 30N simultaneously at a predetermined time, or at the request of each electronic device.

Figure 4:
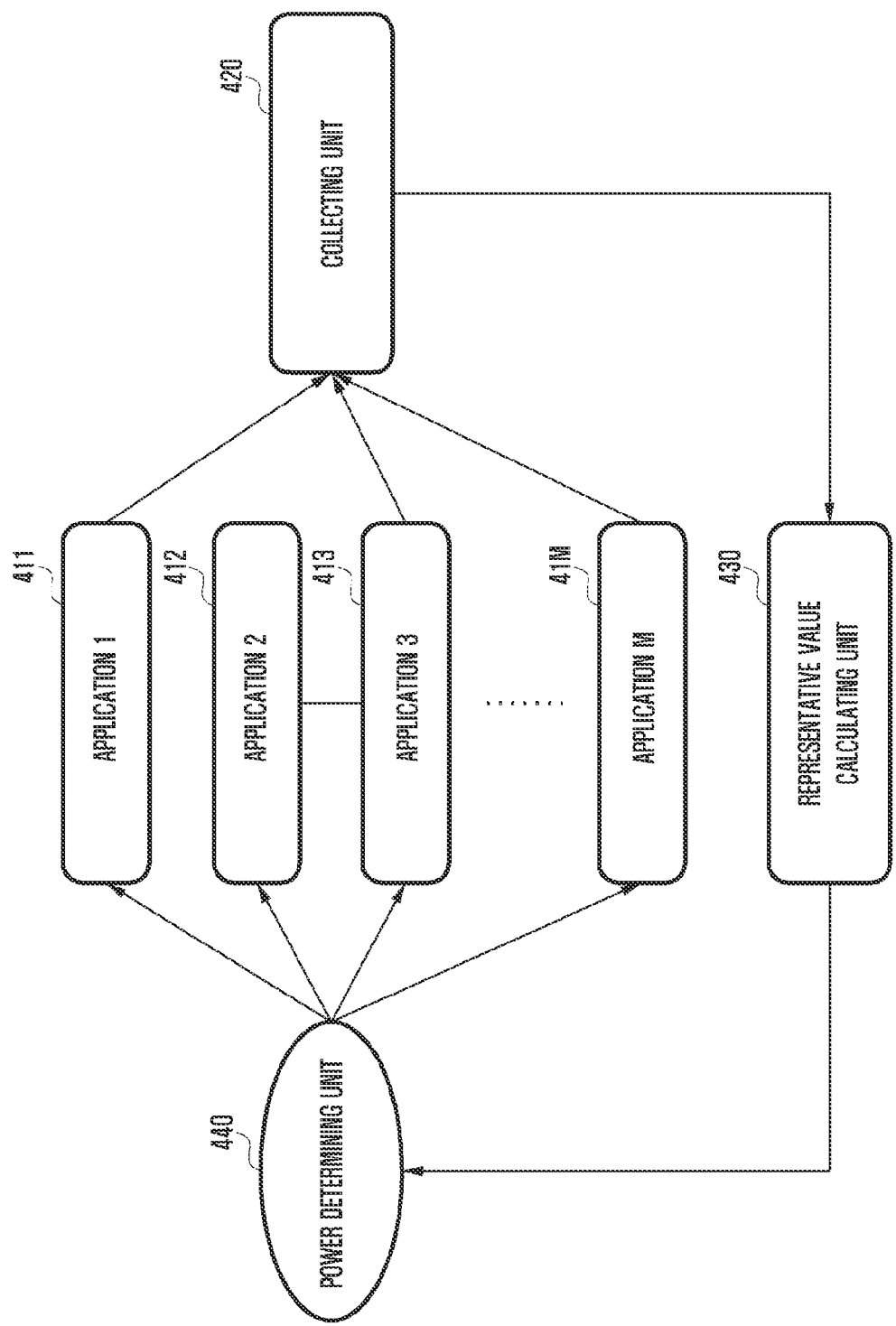
FIG. 4 is a schematic diagram illustrating a method for setting power control data for each application at a server in accordance with an embodiment of the present invention.

FIG. 4 is a schematic diagram illustrating a method for setting power control data for each application at a server in accordance with an embodiment of the present invention. Here, the server may be the server 350 in FIG. 3. The server may include a collecting unit 420 for collecting power control values of applications 1, 2, 3, . . . , and M (indicated by reference numerals 411, 412, 413, . . . , and 41M), a representative value calculating unit 430, and a power determining unit 440. The server may further include a communication unit for receiving power control values of applications 411, 412, 413, . . . , and 41M from electronic devices and for transmitting power control information including power control data to the electronic devices.

Referring to FIG. 4, the server collects power change information about a specific application transmitted from the electronic devices (e.g., 301, 302, . . . , and 30N in FIG. 3) and then changes power control data of the application for each electronic device. The electronic devices may execute respective applications 411, 412, 413, . . . , and 41M. At this time, depending on execution conditions, the electronic devices may execute each application 411, 412, 413, . . . , or 41M, respectively, by using power control data of the corresponding application in the power control information downloaded from the server. Each application 411, 412, 413, . . . , or 41M has an internal power policy (e.g., a local level) and may also change a power level thereof. That is, the electronic device may execute an application on the basis of predefined power control data or power control data generated by a user. For example, if an application is executed with a battery power lower than a predefined value, the user may change power control data in order to optimally operate the application in a current state (e.g., a power saving mode). In this case, the electronic device executes the application on the basis of the power control data and may also transmit application power change information including a power control value to the server. Then the communication unit of the server may receive power control values of respective applications 411, 412, 413, . . . , and 41M from the electronic devices. The collecting unit 420 may collect the application power change information about each application 411, 412, 413, . . . , or 41M through the communication unit. Here, the power change information about applications 411, 412, 413, . . . , and 41M may be created at and received from each electronic device (e.g., 301, 302, . . . , or 30N in FIG. 3), and the collecting unit 420 may respectively collect such power change information about respective application 411, 412, 413, . . . , and 41M. Additionally, the representative value calculating unit 430 of the server calculated a representative value (e.g., an average value, a most frequently occurring value, a median value, etc.) for each application. In this disclosure, it is assumed that a representative value is an average value. Further, the representative value calculating unit may also be referred to as an averaging unit. The averaging unit averages the collected power information for each application. The power determining unit 440 determines power control data of each application on the basis of the averaged power change information for each application. The communication unit may deliver power control information including the power control data to the respective electronic devices.

The power control data may be a sweet spot for determining a display of an execution screen of an application. For example, the sweet spot may be a value for adjusting the (FPS which is the frequency unit of redrawing a frame at a display. Even though the FPS is lowered by a given value, users may be unaware of any change in a display on the screen. Therefore, a method of changing a sweet spot may be used for changing a power level of an application. A sweet spot value may vary according to individual users and/or currently running applications.

As discussed above, if any change in a power control value of any application occurs, the electronic devices transmit the power control value to another electronic device (e.g., the server). Another electronic device may collect such power control values, calculate a representative value (e.g., an average value), and change power control data of each application. Further, this device may create power control information for controlling a power level of each application at the electronic devices, based on the power control data, and then transmit the power control information to the electronic devices.

Figure 5:
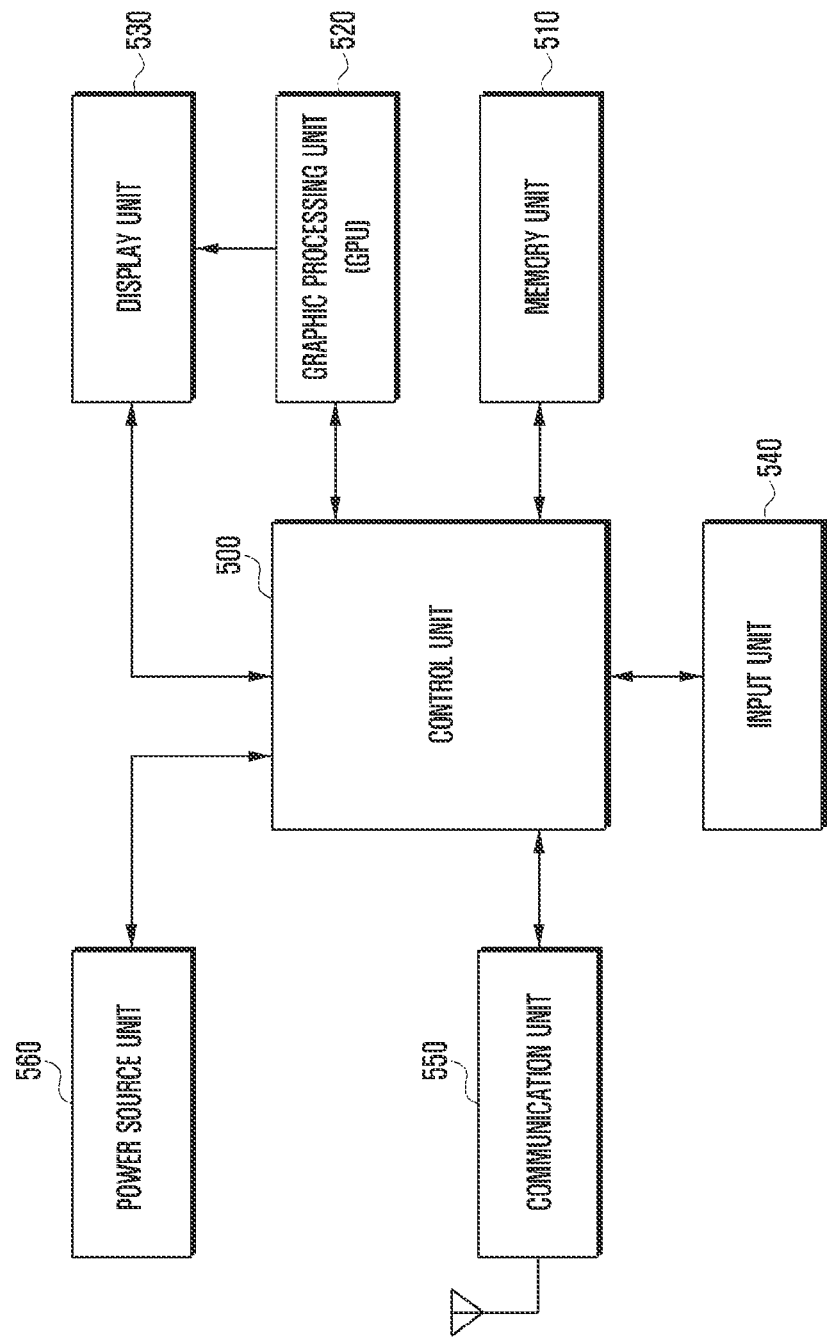
FIG. 5 is a block diagram illustrating an electronic device for performing a power control for each application in accordance with an embodiment of the present invention.

FIG. 5 is a block diagram illustrating an electronic device for performing power control for each application in accordance with an embodiment of the present invention. Here, the electronic device may be the electronic device 101 in FIG. 1, and may include modules in FIG. 2. Also, the electronic device may be the electronic devices 301, 302, . . . , and 30N in FIG. 3. The electronic device may be any device, such as a mobile phone, a smart phone, a tablet, a laptop computer, etc., which uses a battery as an operating power source. Referring to FIG. 5, the electronic device includes a control unit 500, a memory unit 510, a graphic processing unit (GPU) 520, a display unit 530, an input unit 540, a communication unit 550, and a power source unit 560.

Referring to FIG. 5, the control unit 500 controls the overall operation of the electronic device. The memory unit 510 may include a program memory for storing an operating system and any other program associated with embodiments of this invention, and a data memory for storing data or information processed or to be processed.

The communication unit 550 performs a wireless communication function with a base station or an Internet server. The communication unit 550 may include therein a transmitter to up-convert the frequency of an outgoing signal and to amplify the up-converted signal, and a receiver to low-noise-amplify an incoming signal and to down-convert the frequency of the amplified signal. Additionally, the communication unit 550 may include an encoder for encoding an outgoing signal and transferring the encoded signal to the transmitter, and a decoder for decoding an incoming signal received through the receiver. The encoder and decoder may operate based on LTE, WCDMA, GSM, WiFi, WiMAX, NFC, Bluetooth, or the like. In an embodiment of the present invention, the communication unit 550 may have WiFi, Bluetooth, and NFC modules. When power control data of any running application is changed, the communication unit 550 transmits power change information including a power control value to the server 350 and receives power control information for each application from the server 350.

The display unit 530 visually offers various kinds of information and data in the form of text, images, or any other graphic representation under the control of the control unit 500. The display unit 530 may have different sizes depending on device types. Also, when an application is executed, the display unit 530 may consume different amounts of power depending on device types and/or application types. The display unit 530 may be a Liquid Crystal Display (LCD), Organic Light Emitting Diode (OLED), or any other equivalent. The graphic processing unit 520 controls a power level of a screen displayed on the display unit 530 under the control of the control unit 500. Here, a power level may be data for controlling the FPS of data displayed on the display unit 530. That is, under the control of the control unit 530, the graphic processing unit 520 may control a frame rate of data displayed on the display unit 530.

The input unit 540 creates an input signal in response to a user's input action. The input unit 540 may include a finger touch sensing panel for sensing a touch or proximity of a finger, and a pen touch sensing panel for sensing a touch or proximity (e.g., hovering) of a pen. Here, the finger touch sensing panel may be a touch panel of capacitive type, and the pen touch sensing panel may be a touch panel of capacitive type or an electromagnetic resonance (EMR) sensor pad. The input unit 540 senses a touch and/or hovering input and outputs a sensed input to the control unit 500. In some embodiments of the present invention, the display unit 530 and the input unit 540 may be formed in the form of a touch screen.

The power source unit 560 supplies an operating power of the electronic device. For example, the power source unit 560 may be a battery. The power source unit 560 may operate as a power source of the electronic device.

As shown in FIG. 5, the electronic device including the control unit 500, the memory unit 510, the graphic processing unit 520, the display unit 530, the power source unit 560, etc. may process an application in response to a user's input and also process data. Further, the memory unit 510 may store an operating system and various applications running under the operating system. In various embodiments of the present invention, the graphic processing unit 520 may perform a graphic-based processing operation with reduced power consumption under the control of the control unit 500 and display related information on the display unit 530. When an application is executed, the control unit 500 may compare a power level of the power source unit 560 with a predetermined power level and thereby analyze whether a condition of using power control data is satisfied. If such a condition is satisfied, the control unit 500 may use the power control data to display an execution screen of the application.

Figure 6A:
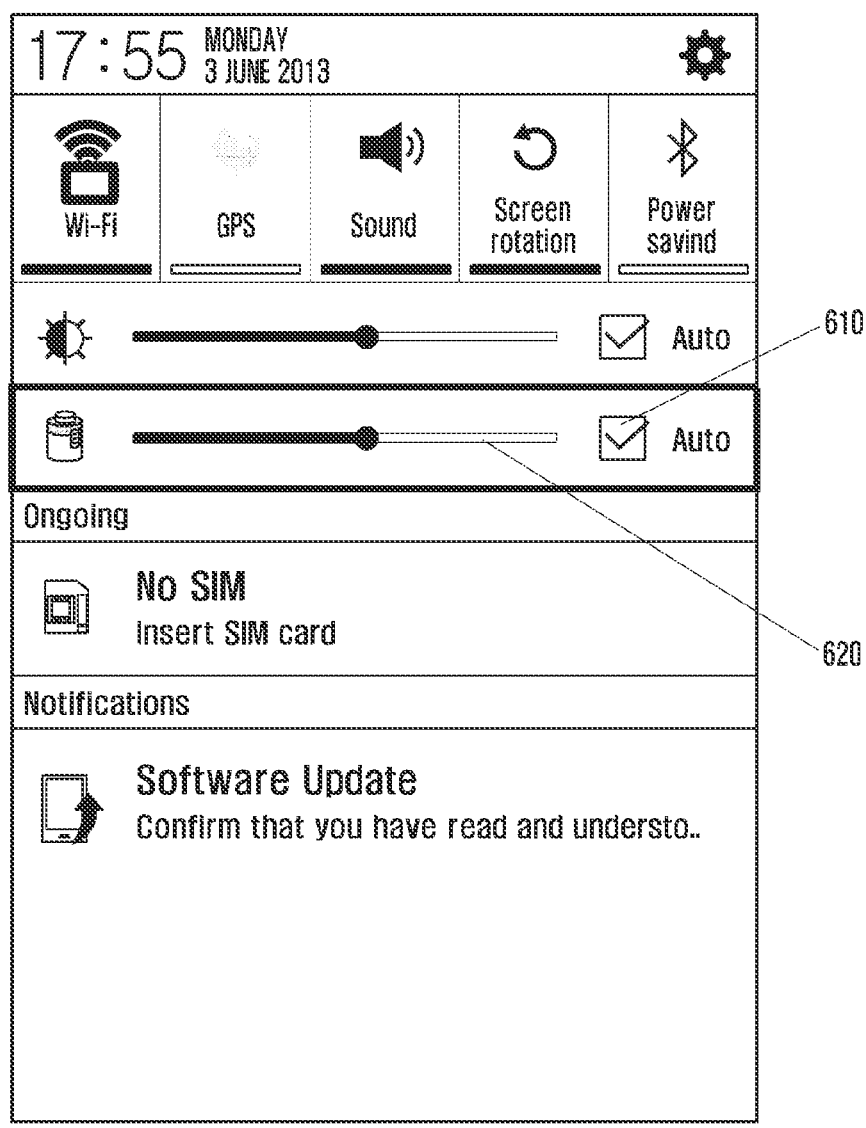
FIG. 6A illustrates an example of a screen for setting a power saving mode at an electronic device in accordance with an embodiment of the present invention.
Figure 6B:
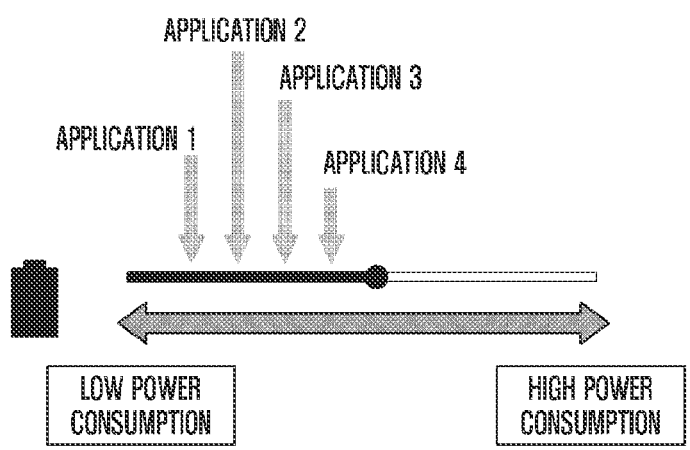
FIG. 6B illustrates an example of different power control depending on applications in accordance with an embodiment of the present invention.

FIG. 6A illustrates an example of a screen for setting a power saving mode at an electronic device in accordance with an embodiment of the present invention. FIG. 6B illustrates an example of different power control depending on applications in accordance with an embodiment of the present invention.

As described above, the control unit 500 may change power control data for applications. For example, the control unit 500 provides a screen as shown in FIG. 6A for selecting a mode for power control by a user. If the user selects an automatic mode in a check box 610, the control unit 500 may change power control data using a changed power level set in the automatic mode. If the user selects a manual mode in the check box 610, the user may set power control data of a corresponding application by manipulating a status bar 620.

FIG. 6B shows examples of applications (e.g., game applications) 1, 2, 3 and 4 linked to the status bar 620 of FIG. 6A. In FIG. 6B, the application 4 has more power consumption than the others, and the application 1 has lower power consumption than the others. In the manual mode, the control unit 500 may control the execution of an application using power control data set by the user.

According to an embodiment of the present invention, the electronic device may change a power level or power control data (e.g., a power control value, or a power use level) of an application before or while the application is executed. The control unit 500 may detect a user request for changing a power level through the input unit 540, create application power change information including a power control value of an application, and transmit the information to the server by controlling the communication unit 550. Here, the application power change information may be an application name, a changed power level, a device type, and the like. Further, the application name may be a package name.

Additionally, the power control value is data for controlling a frame rate of a screen and may be data having a control level between 15 FPS and 60 FPS, for example. The device type is a type of the electronic device and may be a model name of the device. For example, in the case of Samsung mobile devices, the device type may be Samsung Galaxy S1-S4, Samsung Galaxy Note 1-3, and the like. That is, power consumption may vary according to a screen size of the display unit 530 of the electronic device, or the like, and thus power consumption of the application may be controlled depending on the device type.

In addition, the server may collect power change information for each application from electronic devices and update a power change level of each application by averaging the collected power change information. For example, the server may classify the collected power change information for each application of a corresponding device type, obtain a representative value (e.g., an average value, a most frequently occurring value, a median value, etc.), and determine power control data for executing a corresponding application according to the representative value. Also, the server may deliver power control information containing the power control data for each application to the electronic devices. The power control information may contain power control data mapped with each application.

The power change information may be uploaded from a plurality of electronic devices to the server. Additionally, the electronic device may also transmit a device power value (e.g., a current battery power level of the electronic device) at a time point of changing a power control value. Further, when collecting the power change information, the server may also collect power values of the electronic devices to obtain a representative value. Then the server may obtain a representative value of device power levels at a time point when the electronic devices change the power control values, and also obtain a representative value of power control values. As such, power is optimally consumed when the electronic device executes an application with a representative value of the power control values. The server may transmit a device power value together with power control data for each application through power control information. Then, when executing an application, the electronic device may analyze a power value of the power source unit 560 and a representative value of device power levels for the application contained in the power control information. If a changing condition is satisfied, the electronic device may execute the application with the power control data.

Additionally, power change information uploaded from the electronic device to the server may include a device type. The server may collect power change information according to types of the electronic devices and then obtain power control data depending on both the device type and the application. For example, when the power change information is received, the server may identify a device type in the power change information and create power control data of each application for the identified device type. Also, when the power change information is received, the server may identify a type of the electronic device and deliver the power control information of the identified device type to the electronic device.

The power control data of an application may be data for controlling a display power level of an application execution screen. The power control data may be data for controlling FPS, data for controlling an operating dock of the graphic processing unit 520, data for controlling an operating dock of the control unit (e.g., an application processor in case of a mobile device), or the like. For example, the power control data may be used for the graphic processing unit 520 to vary and control a frame rate of application information displayed on the display unit 530. In this case, the frame rate may be changed so that users may be unaware of any change in a display on the screen. A sweet spot is used to control, using a predetermined value, FPS, which is the unit of intervals at which frames are displayed on the display unit 530. As such, a proper value of lowering FPS can reduce power consumption as well as allowing a user to be unaware of such lowering. This value may be varied according to individual users and also according to currently running applications. Therefore, power control data may be changed to satisfy a sweet spot.

There are two modes, namely an automatic mode and a user mode (or referred to as a manual mode) as shown in FIG. 6A, in methods of selecting suitable FPS for a user. The automatic mode refers to a method of automatically changing a power policy value on the basis of external causes such as a degree of battery consumption. The user mode refers to a method of modifying a power policy value to meet a user's instruction.

Specifically, in the automatic mode, an initial power level value is predefined and this value may be defined as the entire device power level (also referred to as a global level). In this case, all applications are executed on the basis of a global level. If battery power is maintained more than a predetermined value, a power level value for a device control may be not varied. However, if battery power is lowered than the predetermined value, the control unit 500 may change a global level value according to a battery level. However, even in the automatic mode, a specially managed application may operate using a different initial value from a global level value.

Additionally, depending on each application, a user may change a power policy in a notification bar or inside of the application. Therefore, each application may have an application inner power policy (also referred to as a local level) and be executed using a local level value instead of a global level value. This local level value may be continuously updated. If there is no local level value stored in a database, a global value may be used.

In order to determine an initial power level value in an automatic mode, a method of reducing a consumed current by changing a global level value according to a battery level and a method of finding a proper FPS, i.e., a sweet spot, on the basis of a user experience may be considered.

When the same application is executed, there is a high possibility that users will require similar degrees of FPS. Therefore, before a user directly defines an initial power level value, it may be effective to use a proper initial power level on the basis of other users' experiences using the same application. If any user who uses a certain application changes or resets a power control value used for executing the application, the control unit 500 may transmit such a value to the server. Then the server may collect such power control values for the same application and obtain a representative value of the collected power control values according to each individual application (or according to both a device type and an application). When more data are collected, the representative value may be more exact and easily applied to a user who executes the application initially. Meanwhile, even in case of changing a value for use other than an initial value, a sweet spot may be utilized. After a user sends power consumption policy information, the server may retransmit a result of calculating a new sweet spot. In this case, a user can set a degree of power consumption from the retransmitted sweet spot. Also, if necessary, a user may receive again such a sweet spot from the server.

As discussed above, in various embodiments of the present invention, the electronic device may include a communication unit, a memory unit, a display unit, and a control unit. The communication unit may be configured to transmit power change information containing a power control value of a running application to a server, and to receive power control information about each application transmitted from the server. The memory unit may be configured to store the power control information about each application. The display unit may be configured to display an execution screen of an application. The control unit may be configured to output the power change information to the communication unit when power control data of the running application is changed, and further configured, if a device power level is a predetermined power change level when a specific application is executed, to control the display unit to display the execution screen of the specific application with power control data of the specific application in the power control information stored in the memory unit.

The power control data may be data for controlling a display of the execution screen of the specific application. For example, the power control data may be data for controlling a frame rate, an operating clock of a CPU, or an operating clock of a control unit. Additionally, the electronic device may further include a CPU that may be configured to adjust a frame rate of the execution screen of the specific application, based on power control data, and to output the adjusted frame rate to the display unit.

The power change level may be a predetermined global power level, and the control unit may be further configured to compare the device power level with the global power level when the specific application is executed, and to determine the device power level as the power control data when the device power level is lower than the global power level.

Also, the power change level may further have a local power level set by a user, and the control unit may be further configured to analyze an execution mode when the specific application is executed, to compare the device power level with the global power level if the execution mode is an automatic mode, or compare the device power level with the local power level if the execution mode is a manual mode, and to determine the device power level as the power control data when the device power level is lower than the global power level in the automatic mode or lower than the local power level in the manual mode.

Figure 7:
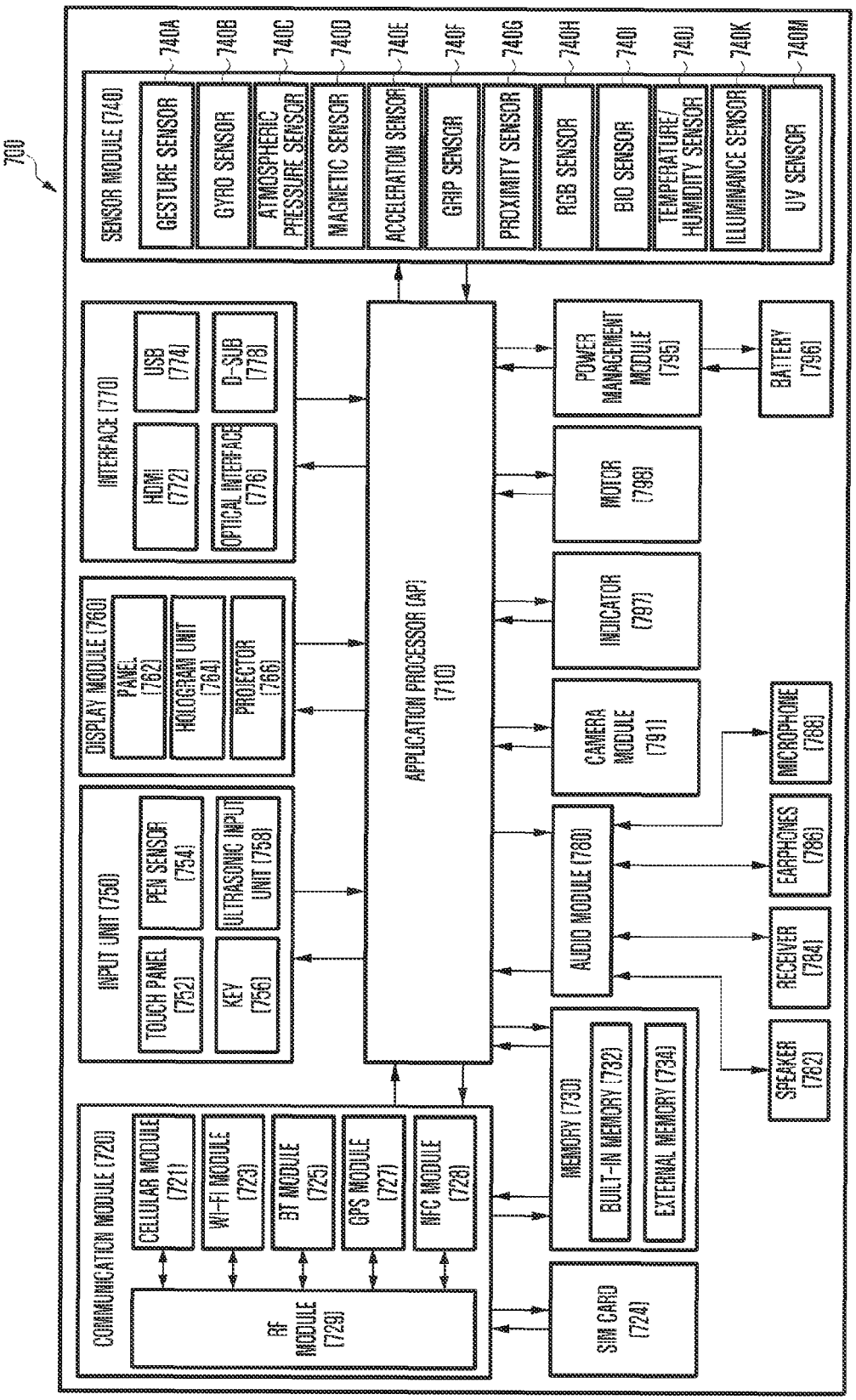
FIG. 7 is a block diagram illustrating a configuration of an electronic device in accordance with an embodiment of the present invention.

FIG. 7 is a block diagram illustrating an electronic device 701 in accordance with an embodiment of the present invention. The electronic device 701 may be, for example, the whole or part of the electronic device 101 shown in FIG. 1. Referring to FIG. 7, the electronic device 701 includes at least one application processor (AP) 710, a communication module 720, a subscriber identification module (SIM) card 724, a memory 730, a sensor module 740, an input unit 750, a display module 760, an interface 770, an audio module 780, a camera module 791, a power management module 795, a battery 796, an indicator 797, and a motor 798.

The AP 710 drives an operating system or applications, controls a plurality of hardware or software components connected thereto, and also performs processing and operation for various data including multimedia data. The AP 710 may be formed as a system-on-chip (SoC), for example. According to an embodiment of the present invention, the AP 710 may further include a GPU.

The communication module 720 (e.g., the communication interface 160) performs data communication with any other electronic device (e.g., the electronic device 104 or the server 106) connected to the electronic device 701 (e.g., the electronic device 101) through the network. According to an embodiment of the present invention, the communication module 720 may include therein a cellular module 721, a WiFi module 723, a BT module 725, a GPS module 727, an NFC module 728, and a Radio Frequency (RF) module 729.

The cellular module 721 offers a voice call, a video call, a message service, an internet service, or the like through a communication network (e.g., LTE, LTE-A, CDMA, WCDMA, UMTS, WiBro, or GSM, etc.). Additionally, the cellular module 721 performs identification and authentication of the electronic device in the communication network, using the SIM card 724. According to an embodiment of the present invention, the cellular module 721 may perform at least part of functions the AP 710 can provide. For example, the cellular module 721 may perform at least part of a multimedia control function.

According to an embodiment of the present invention, the cellular module 721 may include a communication processor (CP). Additionally, the cellular module 721 may be formed of SoC, for example. Although some elements such as the cellular module 721 (e.g., the CP), the memory 730, or the power management module 795 are shown as separate elements being different from the AP 710 in FIG. 7, the AP 710 may be formed to have at least part (e.g., the cellular module 721) of the above elements in an embodiment of the present invention.

According to an embodiment of the present invention, the AP 710 or the cellular module 721 (e.g., the CP) loads commands or data, received from a nonvolatile memory connected thereto or from at least one of the other elements, into a volatile memory to process them. Additionally, the AP 710 or the cellular module 721 stores data, received from or created at one or more of the other elements, in the nonvolatile memory.

Each of the WiFi module 723, the BT module 725, the GPS module 727 and the NFC module 728 may include a processor for processing data transmitted or received therethrough. Although FIG. 7 shows the cellular module 221, the WiFi module 223, the BT module 225, the GPS module 727 and the NFC module 728 as different blocks, at least part of them may be contained in a single Integrated Circuit (IC) chip or a single IC package in an embodiment of the present invention. For example, at least part (e.g., the CP corresponding to the cellular module 721 and a WiFi processor corresponding to the WiFi module 723) of respective processors corresponding to the cellular module 721, the WiFi module 723, the BT module 725, the GPS module 727 and the NFC module 728 may be formed as a single SoC.

The RF module 729 transmits and receives data, e.g., RF signals or any other electric signals. Although not shown, the RF module 729 may include a transceiver, a Power Amp Module (PAM), a frequency filter, a Low Noise Amplifier (LNA), or the like. Also, the RF module 729 may include any component, e.g., a wire or a conductor, for transmission of electromagnetic waves in a free air space. Although FIG. 7 shows that the cellular module 721, the WiFi module 723, the BT module 725, the GPS module 727 and the NFC module 728 share the RF module 729, at least one of them may perform transmission and reception of RF signals through a separate RF module in an embodiment of the present invention.

The SIM card 724 may be inserted into a slot formed at a certain place of the electronic device. The SIM card 724 may contain therein an Integrated Circuit Card Identifier (ICCID) or an International Mobile Subscriber Identity (IMSI).

The memory 730 (e.g., the memory 130) may include an internal or built-in memory 732 and an external memory 734. The internal or built-in memory 732 may include, for example, at least one of a volatile memory (e.g., Dynamic Random Access Memory (RAM) (DRAM), Static RAM (SRAM), Synchronous DRAM (SDRAM), etc.) or a non-volatile memory (e.g., One Time Programmable Read Only Memory (ROM) (OTPROM), Programmable ROM (PROM), Erasable and Programmable ROM (EPROM), Electrically Erasable and Programmable ROM (EEPROM), mask ROM, flash ROM, NAND flash memory, NOR flash memory, etc.).

According to an embodiment of the present invention, the internal or built-in memory 732 may have the form of a Solid State Drive (SSD). The external memory 734 may include a flash drive, e.g., Compact Flash (CF), Secure Digital (SD), Micro Secure Digital (Micro-SD), Mini Secure Digital (Mini-SD), eXtreme Digital (xD), memory stick, or the like. The external memory 734 may be functionally connected to the electronic device 701 through various interfaces. According to an embodiment of the present invention, the electronic device 701 may further include a storage device or medium such as a hard drive.

The sensor module 740 measures a physical quantity or senses an operating status of the electronic device 701, and then converts measured or sensed information into electric signals. The sensor module 740 may include, for example, at least one of a gesture sensor 740A, a gyro sensor 740B, an atmospheric sensor 740C, a magnetic sensor 740D, an acceleration sensor 740E, a grip sensor 740F, a proximity sensor 740G, a color sensor 740H (e.g., RGB (Red, Green, Blue) sensor), a biometric sensor 740I, a temperature-humidity sensor 740J, an illumination sensor 740K, and an ultraviolet (UV) sensor 740M. Alternatively, the sensor module 740 may include, e.g., an E-nose sensor, an electromyography (EMG) sensor, an electroencephalogram (EEG) sensor, an electrocardiogram (ECG) sensor, an infrared (IR) sensor, an iris scan sensor, or a finger scan sensor. Also, the sensor module 740 may include a control circuit for controlling one or more sensors equipped therein.

The input unit 750 may include a touch panel 752, a digital pen sensor 754, a key 756, or an ultrasonic input unit 758.

The touch panel 752 recognizes a touch input in a manner of capacitive type, resistive type, infrared type, or ultrasonic type. Also, the touch panel 752 may further include a control circuit. In case of a capacitive type, a physical contact or proximity may be recognized. The touch panel 752 may further include a tactile layer. In this case, the touch panel 752 may offer a tactile feedback to a user.

The digital pen sensor 754 may be formed in the same or similar manner as receiving a touch input or by using a separate recognition sheet. The key 756 may include, for example, a physical button, an optical key, or a keypad. The ultrasonic input unit 758 is a specific device capable of identifying data by sensing sound waves with a microphone 788 in the electronic device 701 through an input tool that generates ultrasonic signals, thus allowing wireless recognition. According to an embodiment of the present invention, the electronic device 701 may receive a user input from any external device (e.g., a computer or a server) connected thereto through the communication module 720.

The display 760 (e.g., the display 150) may include a panel 762, a hologram 764, or a projector 766. The panel 762 may be, for example, Liquid Crystal Display (LCD), Active Matrix Organic Light Emitting Diode (AM-OLED), or the like. The panel 762 may have a flexible, transparent or wearable form. The panel 762 may be formed of a single module with the touch panel 752. The hologram 764 shows a stereoscopic image in the air using interference of light. The projector 766 projects an image onto a screen, which may be located at the inside or outside of the electronic device 701. According to an embodiment of the present invention, the display 760 may further include a control circuit for controlling the panel 762, the hologram 764, and the projector 766.

The interface 770 may include, for example, a High-Definition Multimedia Interface (HDMI) 772, a Universal Serial Bus (USB) 774, an optical interface 776, or a D-sub-miniature (D-sub) 778. The interface 770 may be contained, for example, in the communication interface 160 shown in FIG. 1. Alternatively, the interface 770 may include, for example, a Mobile High-definition Link (MHL) interface, a Secure Digital (SD) card/Multi-Media Card (MMC) interface, or an Infrared Data Association (IrDA) interface.

The audio module 780 performs a conversion between sounds and electric signals. At least part of the audio module 780 may be contained, for example, in the input/output interface 140 shown in FIG. 1. The audio module 780 may process sound information inputted or outputted through a speaker 782, a receiver 784, an earphone 786, or a microphone 788.

The camera module 791 is a device capable of obtaining still images and moving images. According to an embodiment of the present invention, the camera module 791 may include at least one image sensor (e.g., a front sensor or a rear sensor), a lens, an Image Signal Processor (ISP), or a flash (e.g., Light Emitting Diode (LED) or xenon lamp).

The power management module 795 manages electric power of the electronic device 701. The power management module 795 may include, for example, a Power Management Integrated Circuit (PMIC), a charger IC, or a battery gauge.

The PMIC may be formed, for example, of an IC chip or an SoC. Charging may be performed in a wired or wireless manner. The charger IC may charge a battery 796 and prevent overvoltage or overcurrent from a charger. According to an embodiment of the present invention, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge measures the residual amount of the battery 796 and a voltage, current or temperature in a charging process. The battery 796 stores or creates electric power therein and supplies electric power to the electronic device 701. The battery 796 may be, for example, a rechargeable battery or a solar battery.

The indicator 797 shows thereon a current status (e.g., a booting status, a message status, or a recharging status) of the electronic device 701 or of its part (e.g., the AP 710). The motor 798 converts an electric signal into a mechanical vibration. Although not shown, the electronic device 701 may include a specific processor (e.g., GPU) for supporting a mobile TV. This processor may process media data that comply with standards of Digital Multimedia Broadcasting (DMB), Digital Video Broadcasting (DVB), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The electronic device according to various embodiments of the present invention may include a communication unit; a memory unit; a display unit configured to display an execution screen of an application; and a control unit configured to: generate power change information containing a power control value of an application, control the communication unit to transmit power change information to another electronic device, and to receive power control information about the application from the another electronic device, control the memory unit to store the power control information about the application, and execute the application with a power control data of the application included in the power control information if a power level of the electronic device is lower than a predetermined power change level.

Another electronic device may be a server.

The power control data may be data for controlling a display of the execution screen of the specific application. The power control data may be data for controlling a frame rate, an operating dock of a CPU, or an operating dock of a control unit.

The electronic device may further include a GPU configured to adjust a frame rate of the execution screen of the application, based on the power control data stored in the memory unit, and to control the display unit to output the execution screen of the application with the adjusted frame rate.

The power change level may be a predetermined global power level, and the control unit may be further configured to compare the device power level with the global power level when the specific application is executed, and to execute the application with the power control data of the application when the power level of the electronic device is lower than the predetermined global power level.

The power change level may further have a local power level set by a user, and the control unit may be further configured to analyze an execution mode when the specific application is executed, to compare the device power level with the global power level if the execution mode is an automatic mode, or compare the device power level with the local power level if the execution mode is a manual mode, and to execute the application with the power control data of the application when the power level of the electronic device is lower than the predetermined global power level in the automatic mode or lower than the local power level in the manual mode.

The control unit may be further configured to execute the specific application with normal power control data when the device power level is a normal power level, and the normal power data controls the screen display of the application with a power level not lower than the power control data does.

According to various embodiments of the present invention, a second electronic device for controlling power of a first electronic device may include a collecting unit configured to collect power change information about applications transmitted from the first electronic device, the power change information containing application names and power control values; a representative value calculating unit configured to calculate a representative value of the power control values for each of the applications from the collected power change information; a power determining unit configured to create power control information by defining the calculated representative value as power control data of each of the applications; and a communication unit configured to transmit the power control information to the first electronic device.

The first electronic device may be a terminal, and the second electronic device may be a server.

The representative value calculating unit may calculate an average value of the power control values for each application.

The control unit may execute an application with normal power data if a power level of the device is a normal power level. Such normal power data may control a screen display of an application at a power level not lower than power control data does.

Figure 8:
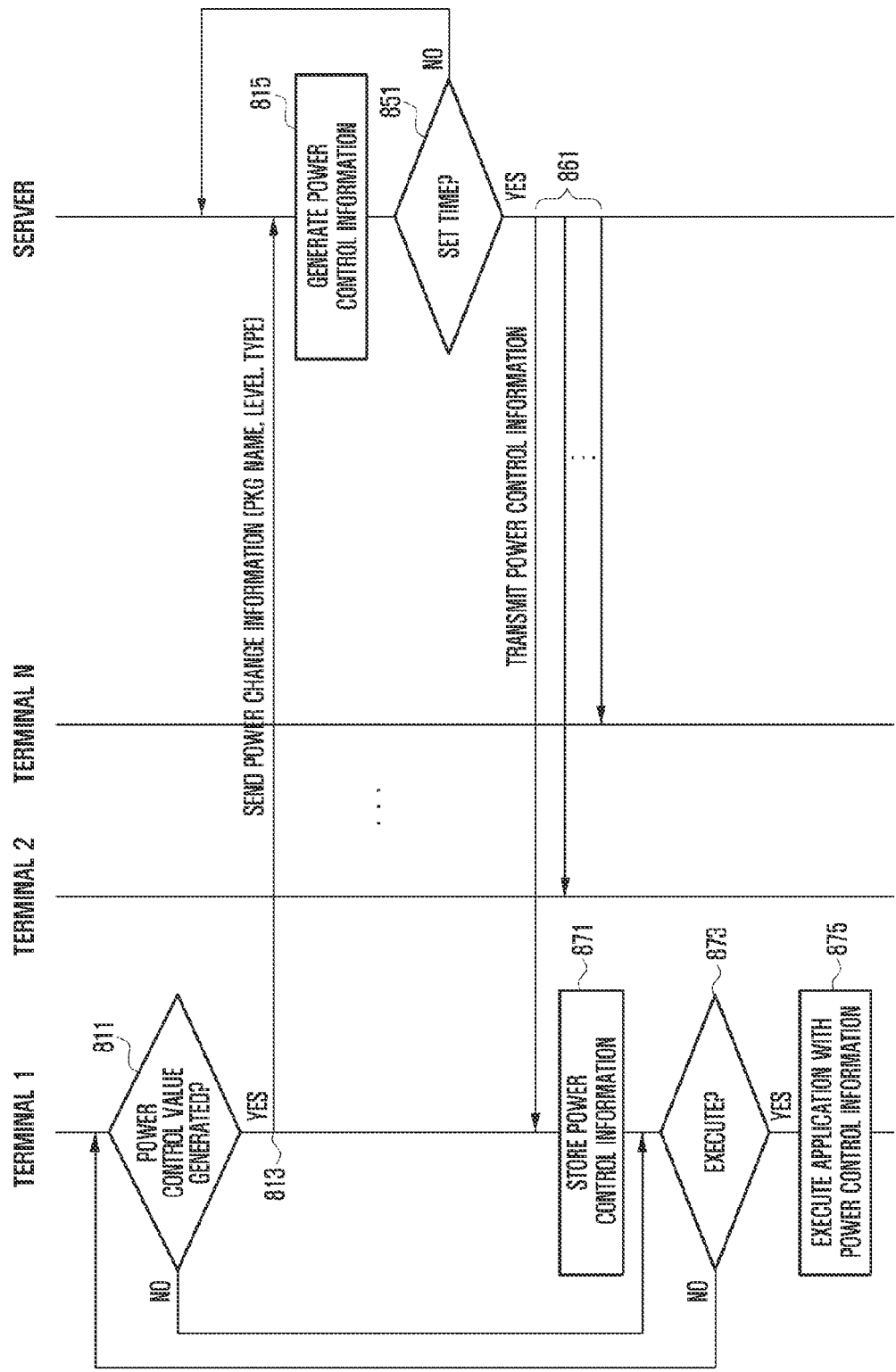
FIG. 8 is a flow diagram illustrating a power control method for each application performed at electronic devices in accordance with an embodiment of the present invention.

FIG. 8 is a flow diagram illustrating a power control method for each application performed at electronic devices in accordance with an embodiment of the present invention. FIG. 8 shows an example of having N electronic devices and executing an application at the first electronic device.

Referring to FIG. 8, when the first electronic device (terminal 1) is about to execute a specific application, the control unit 500 of the first electronic device checks, at step 811, whether there is a change in a power level of the electronic device or in power control data of the specific application. Hereinafter, although a specific application is described, it is also applicable to each of a plurality of applications. If any change of the power level or the power control value occurs, the control unit 500 of the first electronic device detects a power control value of the specific application at step 811. If no change of the power level or the power control occurs, it proceeds to step 873.

At step 813, the control unit 500 creates power change information containing the power control value of the specific application and transmits it to the server. Here, the power change information may contain an application name, a power level, and the like. The power change information may further contain a device type.

At step 815, the server collects the power change information about the specific application from respective electronic devices (i.e., the terminals among terminal 1 to terminal N that have the specific application installed), calculates a representative value of collected power control values of the specific application of respective electronic devices, and sets power control data of the specific application of the respective electronic devices. Here, the server may check an application name in the received power change information and collect the changed power level of the specific application. Alternatively, the server may check a device type in the received power change information, classify application information according to device types, check an application name in the received power change information, and collect the power control value of the specific application. Alternatively, the server may check an application name in the received power change information, collect the power control value of the specific application, analyze a device type of the power control value, and collect the power control values according to device types and applications.

The server may receive the power change information about the specific application from the respective electronic devices as discussed above. The received power change information may be processed (e.g., collected for the specific application, calculated to obtain a representative value, used to determine power control data, etc.) in real time or at regular/predetermined intervals. The power control data for the specific application may be stored as power control information. Thereafter, the server may transmit the power control information to the respective electronic devices. This delivery may be performed simultaneously at a preset time or respectively at the request of each electronic device. In the former case, the server detects a preset time at step 851 and transmits the power control information to each electronic device at step 861. Here, the power control information may depend on device types and be classified according to applications. That is, the server may transmit power control information based on each device type, and the power control information may be formed of power control data classified on the basis of applications of that device type.

The electronic devices receive and store the power control information corresponding to their device types at step 871. Thereafter, the electronic device determines or detects the execution of the specific application at step 873 and processes the specific application with corresponding power control data at step 875. For example, the power control data may be data for controlling FPS of the screen processed by the graphic processing unit 520.

Specifically, if the execution of an application is detected at step 873, the electronic device may determine power control data by comparing a battery power level with a predetermined power level. For example, in an automatic mode, a power change level may be a global power level for defining a device power level. If a device power level is lower than a global power level when an application is executed, it is determined to use power control data. If a device power level is not lower than a global power level when an application is executed, it is determined to use normal power control data.

Additionally, a power change level may further include a local power level set by a user. In this case, the control unit may analyze an application execution mode when an application is executed. If the execution mode is an automatic mode, the power control data is determined to be used when a device power level is lower than a global power level, and the normal power control data is determined to be used when a device power level is not lower than a global power level. If the execution mode is a manual mode, the power control data is determined to be used when a device power level is lower than a local power level, and the normal power control data is determined to be used when a device power level is not lower than a local power level.

As shown in FIG. 8, each electronic device may transmit, to the server, a power control value (i.e., a power level) generated depending on the specific application (or each of a plurality of applications) by a user. Then the server may collect such power control values and obtain a representative value (e.g., an arithmetical mean, a geometric mean, etc.) of the collected power control values. Thereafter, the server may determine an initial power consumption policy of application(s) using a sweet spot. Then the server may transmit the determined sweet spot to the respective electronic devices, which may control the execution of the specific application (or each of a plurality of applications) on the basis of the sweet spot.

Figure 9:
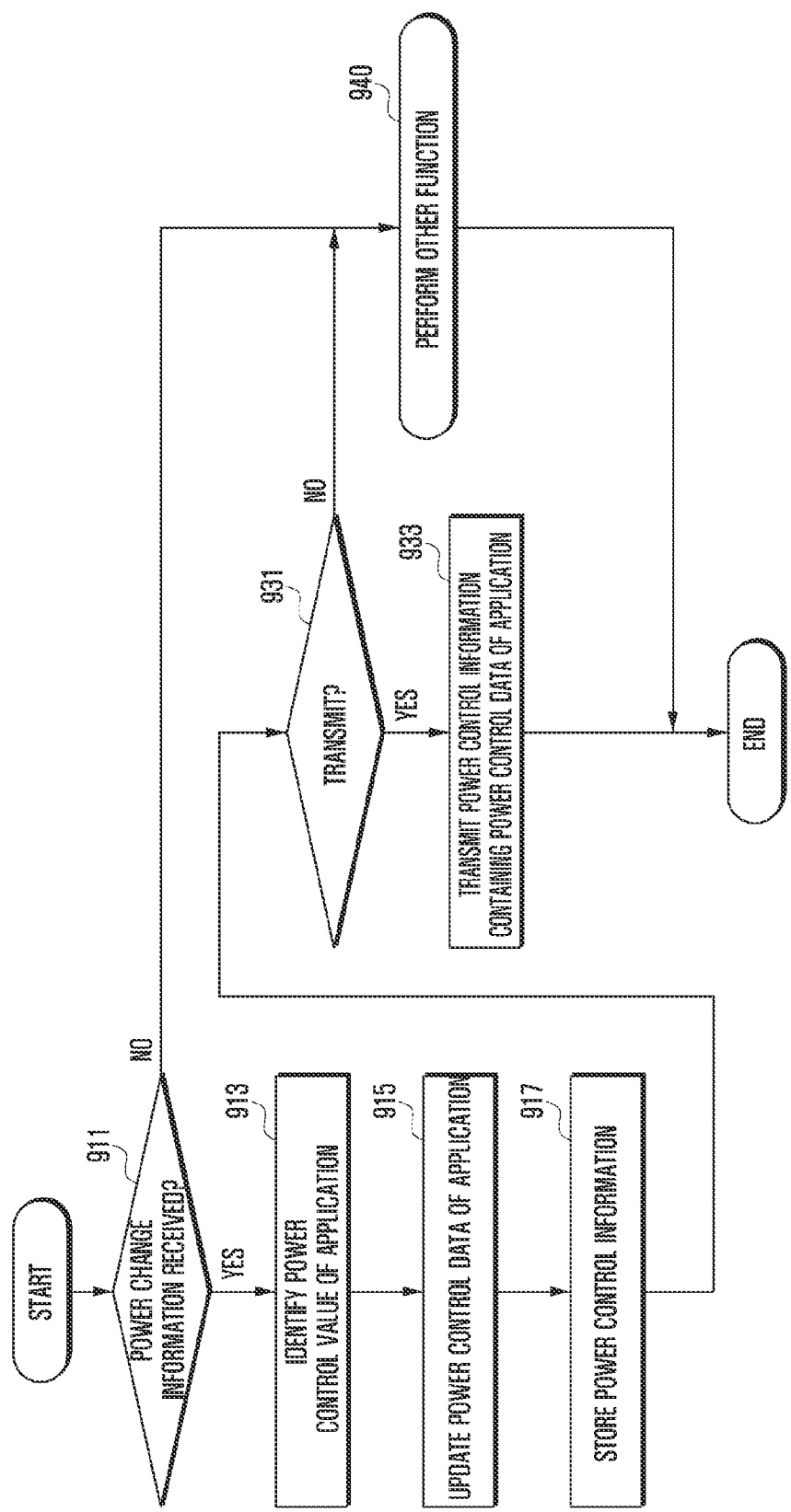
FIG. 9 is a flow diagram illustrating a process for creating power control information of an electronic device at a server in accordance with an embodiment of the present invention.

FIG. 9 is a flow diagram illustrating a process for creating power control information of an electronic device at a server in accordance with an embodiment of the present invention.

Referring to FIG. 9, if power change information about a certain application is received from the electronic devices, the server detects it at step 911. Then, at step 913, the server analyzes the detected power change information and identifies a power control value of the certain application. Here, the application power change information may contain a device type, an application name, a power control value, and the like. The server may process the application power change information in real time or at regular/predetermined intervals. A method of processing the application power change information may include sorting the application power change information according to device types, collecting power control values according to application names in each device type, calculating an average value of the collected power control values in each application name, creating power control information for each device type from the average value, and storing the created information. Here, the power control information for each device type may have a mapping relation between each application and power control data, i.e., sweet spot, for executing the application.

Meanwhile, the server determines or detects a transmission time for power control information at step 931 and then transmits the power control information of each device type at step 933. This transmission may be performed individually in response to a request of each electronic device or performed simultaneously at regular/predetermined intervals. In the former case, the server may identify a device type of the electronic device requesting transmission and transmit power control information of the identified device type to the electronic device.

Additionally, if there is no reception of application power change information or no transmission of power control information, the server may perform the other predetermined function at step 940.

In various embodiments of the present invention, a method for processing power control information for a power control of the electronic device at the server may include an operation of collecting power change information about applications transmitted from the electronic devices (here, the power change information contains application names and power change values), an operation of averaging the power change values for each application from the collected power change information, an operation of creating power control information by defining the averaged power change value as power control data of a corresponding application, and an operation of delivering the power control information to the electronic devices.

In the processing method performed at the server, the power change information about applications may further contain device types. In this case, the operation of creating the power control information may include creating the power control information for each device type, and the operation of transmitting the power control information may include transmitting the power control information corresponding to a device type of the electronic device. For example, the device type of the electronic device may be determined according to a display size of the electronic device and a quantity of power consumption required for an application display.

The power control information may be delivered in response to a request of the electronic device, and the power control information may correspond to the device type of first electronic device.

Figure 10:
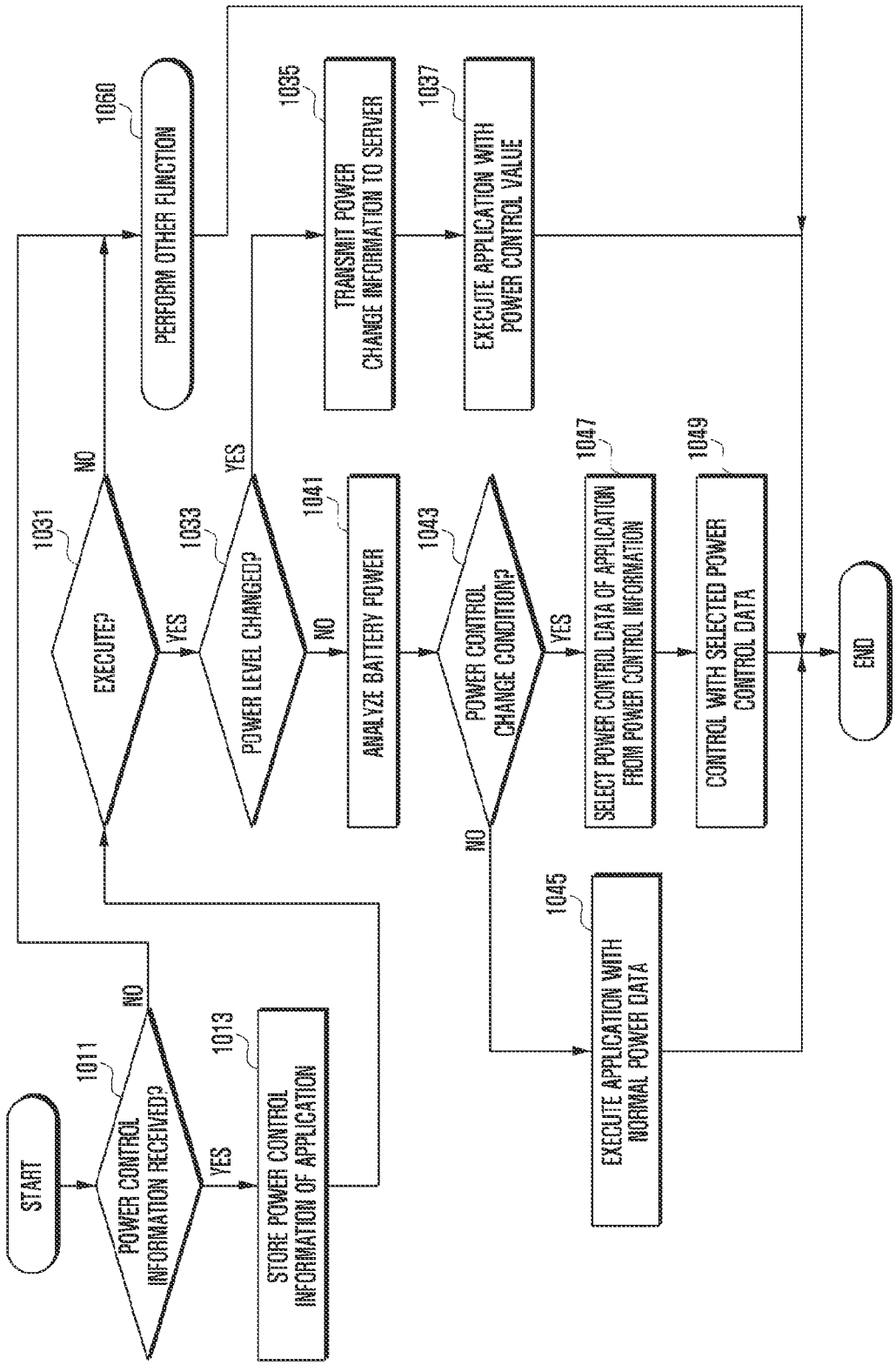
FIG. 10 is a flow diagram illustrating a process for controlling power for each application at an electronic device in accordance with an embodiment of the present invention.

FIG. 10 is a flow diagram illustrating a process for controlling power for each application at an electronic device in accordance with an embodiment of the present invention.

Referring to FIG. 10, when the electronic device downloads power control information, the control unit 500 detects it at step 1011. The control unit 500 receives the power control information corresponding to its own device type and stores it in the memory unit 510 at step 1013. Here, the power control information may be received at the request of the control unit 500 or at regular/predetermined intervals.

If the power control information is not received, the control unit 500 performs the other predetermined function at step 1060. If the power control information is received and stored, the control unit 500 determines or detects execution of a specific application at step 1031. If there is no request for executing a specific application while the power control information is stored, the control unit 500 performs the other predetermined function at step 1060. If there is a request for executing a specific application, the control unit 500 detects it at step 1031 and determines, at step 1033, whether a power level is changed. Here, a change of a power level may be a case in which a user changes a power control value of a running application. If the power control value is not changed, the control unit 500 analyzes a battery power level at step 1041. Then the control unit 500 may determine power control data of the application by comparing the battery power level with a power change level according to a selected mode. The power change level may be a predetermined global power level and a user-defined local power level. The control unit 500 may analyze an execution mode when an application is executed. If the execution mode is an automatic mode, the control unit may compare the battery power level with the global power level and determine the battery power level as the power control data when the battery power level is lower than the global power level. If the execution mode is a manual, the control unit may compare the battery power level with the local power level and determine the battery power level as the power control data when the battery power level is lower than the local power level. If the battery power level is not lower than the global power level or the local power level, the control unit 500 may determine it as normal power control data. That is, the control unit 500 determines whether the power control change conditions are satisfied in step 1043.

Therefore, if power control change conditions are not satisfied, the control unit 500 controls the execution of an application with normal power control data at step 1045. In this case, the normal power control data may be data for displaying the screen on the display unit 530 with a specific FPS set as a default. For example, the graphic processing unit 520 may control the application to output display data on the display unit 530 with a normal frame rate (e.g., a frame rate of 60 FPS in case of an application with 60 FPS, a frame rate of 30 FPS in case of an application with 30 FPS, etc.).

If any power control change condition is satisfied at step 1043, the control unit 500 retrieves or selects, at step 1047, the power control data of a corresponding application from the power control information stored in the memory unit 510 and then controls, at step 1049, the graphic processing unit 520 to display the screen of the application with the power control data. For example, the power control data may be data for displaying the screen with a specific FPS lower than normal power data. Then the graphic processing unit 520 may output display data to the display unit 530 with FPS adjusted by the power control data. The power control data may be data to be used for the graphic processing unit 520 to adjust and control a display frame of the display unit 530. That is, a changed power level may be used for the graphic processing unit 520 to process FPS to a lower value than a predetermined FPS. As discussed above, FPS is the frequency unit of redrawing a frame on the display unit 530. Even though the FPS is lowered by a proper value, users may be unaware of any change in the screen. The changed power level may be determined at the server. Specifically, the server may collect power level change values of each application from the respective electronic devices, average the collected values for each application, and determine the power control data, i.e., a sweet spot, which is optimized to execute the application in a state where a battery fails to maintain a predetermined quantity of charge. In case of an insufficient residual quantity of battery or in order to maintain a display screen of application with a proper FPS, a user may set a desired FPS of a specific application by using a status bar as shown in FIG. 6A. At this time, the user may experimentally set an FPS so that a change in FPS may be invisible or not be an eyesore.

If a change in a power level is performed when an application is executed in step 1033, the control unit 500 transmits the application power change information containing the power control value to the server at step 1035, and controls the graphic processing unit 520 to display the application with the power control value at step 1037. For example, the graphic processing unit 520 may process display data with a new FPS of changed power level and output it to the display unit 530.

A power control method of an electronic device according to various embodiments of the present invention may include an operation of transmitting power change information containing a power control value of a running application to a server when power control data of the running application is changed, an operation of receiving and storing power control information about each application transmitted from the server, and an operation of, if a power level of the electronic device is lower than a predetermined power change level when a specific application is executed, executing the specific application with power control data of the specific application in the power control information stored in the electronic device.

The power control data may be data for controlling a screen display of the specific application. For example, the power control data may be data for controlling a frame rate, an operating clock of a GPU, or an operating clock of a control unit.

The power change level may be a predetermined global power level, and the operation of executing the specific application may include comparing the device power level with the global power level when the specific application is executed, and determining the device power level as the power control data when the device power level is lower than the global power level. Also, the power change level may further have a local power level set by a user, and the operation of executing the specific application may further include analyzing an execution mode when the specific application is executed, comparing the device power level with the global power level if the execution mode is an automatic mode, or comparing the device power level with the local power level if the execution mode is a manual mode, and determining the device power level as the power control data when the device power level is lower than the global power level in the automatic mode or lower than the local power level in the manual mode.

The operation of executing the specific application may include executing the specific application with normal power control data when the device power level is a normal power level, and the normal power data may control the screen display of the specific application with a power level not lower than the power control data does. Also, the power change level may be a predetermined global power level or a local power level set by a user, and the operation of executing the specific application may include analyzing an execution mode when the specific application is executed, comparing the device power level with the global power level if the execution mode is an automatic mode, then determining the device power level as the normal power level when the device power level is not lower than the global power level, comparing the device power level with the local power level if the execution mode is a manual mode, then determining the device power level as the power change level when the device power level is not lower than the local power level, and executing the specific application with the normal power control data when the device power level is the normal power level.

The operation of transmitting the application power information may include, if power control data of an application is changed, generating power control information containing a device type, an application name, a current device power level, and a power control value, and transmitting the power control information to the server.

The operation of receiving and storing the power control information may include checking a device type of the power control information about each application, and storing the power control information having the same device type as the electronic device has. Here, the power control information may contain sweet spot power control data obtained by averaging power control values of the specific application received from a plurality of electronic devices.

As discussed above, the electronic device may reduce power consumption by selectively adjusting it according to applications. Specifically, the electronic device may transmit information about power consumption for each application to the server. Then the server may collect such information, change a power level of each application, and deliver the changed power level to the electronic device. This method based on different power policies for applications may reduce the whole power consumption and effectively use electric power.

A power control method of an electronic device according to various embodiments of the present invention may include an operation of transmitting power change information containing a power control value of a running application to other electronic device, an operation of receiving and storing power control information about each application transmitted from another electronic device, and an operation of, if a power level of the electronic device is lower than a predetermined power change level when a specific application is executed, executing the specific application with power control data of the specific application in the power control information stored in the electronic device.

Another electronic device may be a server.

The power change information may be transmitted to the server when the power control value of the application is changed The power control data may be data for controlling a screen display of the specific application.

The power control data may be data for controlling a frame rate, an operating clock of a GPU, or an operating clock of a control unit.

The power change level may be a predetermined global power level, and the operation of executing the specific application may include comparing the device power level with the global power level when the specific application is executed, and executing the application with the power control data of the application when the power level of the electronic device is lower than the predetermined global power level.

The power change level may further have a local power level set by a user, and the operation of executing the specific application may further include analyzing an execution mode when the specific application is executed, comparing the device power level with the global power level if the execution mode is an automatic mode, or comparing the device power level with the local power level if the execution mode is a manual mode, executing the application with the power control data of the application when the power level of the electronic device is lower than the predetermined global power level in the automatic mode or lower than the local power level in the manual mode.

The operation of executing the specific application may include executing the specific application with normal power data when the device power level is a normal power level, and the normal power data may control the screen display of the specific application with a power level not lower than the power control data does.

The power change level may be a predetermined global power level or a local power level set by a user, and the operation of executing the specific application may include analyzing an execution mode when the specific application is executed, comparing the device power level with the global power level if the execution mode is an automatic mode, then executing the application with the normal power data of the application when the power level of the electronic device is not lower than the predetermined global power level; comparing the power level of the electronic device with the local power level if the execution mode is a manual mode, and then executing the application with the normal power data of the application when the power level electronic device is not lower than the local power level; and executing the application with the normal power data when the device power level is the normal power level.

The operation of transmitting the power change information may include, if the power control data of the application is changed, creating the power change information containing a device type, an application name, a current device power level, and the power control value; and transmitting the power change information to the server.

The operation of receiving and storing the power control information may include checking a device type of the power control information about each application, and storing the power control information having the same device type as the electronic device has. Here, the power control information may contain sweet spot power control data obtained by averaging power control values of the specific application received from a plurality of electronic devices.

According to various embodiments of the present invention, a method for processing power control information for power control of a first electronic device at a second electronic device, the method comprising: collecting power change information about applications transmitted from the first electronic device, the power change information containing application names and power control values; calculating a representative value of the power control values for each of the applications from the collected power change information; creating power control information by defining the calculated representative value as power control data of each of the applications; and transmitting the power control information to the first electronic device.

The first electronic device may be a terminal, and the second electronic device may be a server.

The representative value may be an average value of the power control values.

The power change information about applications may further contain device types. In this case, the operation of creating the power control information may include creating the power control information for each device type, and the operation of transmitting the power control information may include transmitting the power control information corresponding to the device type of the first electronic device.

The device type of the first electronic device may be determined according to a display size of the first electronic device and a quantity of power consumption required for an application display.

The power control information may be transmitted in response to a request of the first electronic device, and the power control information may correspond to the device type of the first electronic device.

When a user initially executes a certain application in the electronic device, the application is running with power control data (e.g., a sweet spot) which is optimized using a representative value (e.g., an average value). Therefore, it is easy to compare previous information when a degree of power consumption is varied. Additionally, a certain application which is not sensitive to a frame rate (i.e., FPS) may not use a specified degree of power consumption. In this case, a sweet spot may be automatically set so that power consumption can be improved with user's unawareness.

According to various embodiments of the present invention, at least some of the devices (e.g., modules or functions thereof) or the method (e.g., operations) according to the present invention may be implemented by a command stored in a non-transitory computer-readable storage medium in a programming module form. When the command is executed by one or more processors (e.g., the processor 122), the one or more processors may execute a function corresponding to the command. The non-transitory computer-readable storage medium may be, for example, the memory 130. At least a part of the programming module may be implemented (e.g., executed) by, for example, the processor 210. At least a part of the programming module may include, for example, a module, a program, a routine, a set of instructions, and/or a process for performing one or more functions.

The non-transitory computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction (for example, e.g., programming module), such as a ROM, a RAM, a flash memory and the like. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

According to various embodiments of the present invention, in a computer-readable storage medium which records thereon various commands, the commands are defined to enable at least one processor to perform at least one operation when being executed by the processor. The at least one operation may include an operation of transmitting power change information containing a power control value of a running application to other electronic device, an operation of receiving and storing power control information about each application transmitted from the other electronic device, and an operation of, if a power level of the electronic device is a predetermined power change level when a specific application is executed, executing the specific application with power control data of the specific application in the power control information stored in the electronic device.

While the present invention has been particularly shown and described with reference to certain embodiments thereof, it will be understood by those skilled in the art that various changes in form and details may be made therein without departing from the spirit and scope of the present invention as defined by the appended claims and their equivalents.

What is claimed is:

1. A power control method of an electronic device, comprising:
   transmitting power change information of an application to another electronic device;
   receiving and storing power control information of the application transmitted from the another electronic device; and
   if a power level of the electronic device is lower than a predetermined power change level when the application is executed, executing the application based on the power control information stored in the electronic device,
   wherein the power change information comprises a power control value which controls a frame rate of a screen of the application set by a user of the electronic device, and
   wherein the power control information is determined based on a plurality of power control values transmitted from a plurality of apparatuses, in which an application installed is a same kind as the application.

2. The power control method of claim 1, wherein the another electronic device is a server.

3. The power control method of claim 2, wherein the power change information is transmitted to the server when the power control value of the application is changed.

4. The power control method of claim 1, wherein the power control value is data for controlling an operating clock of a graphic processing unit or an operating clock of a control unit.

5. The power control method of claim 1, wherein the predetermined power change level is a predetermined global power level, and
   wherein executing the application includes:
   comparing the power level of the electronic device with the predetermined global power level when the application is executed; and
   executing the application based on the power control information of the application when the power level of the electronic device is lower than the predetermined global power level.

6. The power control method of claim 5, wherein the predetermined power change level further includes a local power level set by a user, and
   wherein executing the application further includes:
   analyzing an execution mode when the application is executed;
   comparing the power level of the electronic device with the predetermined global power level if the execution mode is an automatic mode, or comparing the power level of the electronic device with the local power level if the execution mode is a manual mode; and
   executing the application based on the power control information of the application when the power level of the electronic device is lower than the predetermined global power level in the automatic mode or lower than the local power level in the manual mode.

7. The power control method of claim 1, wherein executing the application includes executing the application with normal power data when the power level of the electronic device is a normal power level, and
wherein the normal power data controls the screen display of the application with a power level not lower than the power control information does.

8. The power control method of claim 7, wherein the predetermined power change level is a predetermined global power level or a local power level set by a user, and
wherein executing the application includes:
analyzing an execution mode when the application is executed;
comparing the power level of the electronic device with the global power level if the execution mode is an automatic mode, and then executing the application with the normal power data of the application when the power level of the electronic device is not lower than the predetermined global power level;
comparing the power level of the electronic device with the local power level if the execution mode is a manual mode, and then executing the application with the normal power data of the application when the power level electronic device is not lower than the local power level; and
executing the application with the normal power data when the device power level is the normal power level.

9. The power control method of claim 1, wherein transmitting the power change information includes:
if the power control value of the application is changed, creating the power change information containing a device type, an application name, a current device power level, and the power control value; and
transmitting the power change information to the server.

10. The power control method of claim 1, wherein receiving and storing the power control information includes:
checking a device type of the power control information about the application; and
storing the power control information having a same device type as that of the electronic device,
wherein the power control information is obtained by averaging power control values of the application received from the plurality of apparatuses.

11. A method for processing power control information for power control of a plurality of first electronic devices at a second electronic device, the method comprising:
collecting power change information of an application transmitted from the plurality of first electronic devices in which an application installed is a same kind as the application;
generating a power control information of the application based on the plurality of the power control values transmitted from the plurality of first electronic devices; and
transmitting the power control information to the plurality of first electronic devices, wherein the power change information comprises a power control value which controls a frame rate of a screen of the application set by a user of the plurality of first electronic devices.

12. The method of claim 11, wherein the first electronic device is a terminal, and the second electronic device is a server.

13. The method of claim 11, wherein the power control information is an average value of the plurality of the power control values.

14. The method of claim 11, wherein the power change information about the applications further contains device types,
wherein creating the power control information comprises creating the power control information for each of the device types, and
wherein transmitting the power control information includes transmitting the power control information corresponding to a device type of the first electronic device.

15. The method of claim 14, wherein the device type of the first electronic device is determined according to a display size of the first electronic device and a quantity of power consumption required for an application display.

16. The method of claim 15, wherein the power control information is transmitted in response to a request of the first electronic device, and
wherein the power control information corresponds to the device type of the first electronic device.

17. An electronic device comprising:
a communication interface;
a memory;
a display; and
a processor configured to:
control the communication interface to transmit power change information of an application to another electronic device, and to receive power control information of the application from the another electronic device,
control the memory to store the power control information of the application, and
execute, if a power level of the electronic device is lower than a predetermined power change level, the application based on the power control information,
wherein the power change information comprises a power control value which controls a frame rate of a screen of the application set by a user of the electronic device, and
wherein the power control information is determined based on a plurality of power control values transmitted from a plurality of apparatuses, in which an application installed is a same kind as the application.

18. The electronic device of claim 17, wherein the another electronic device is a server.

19. The electronic device of claim 17, wherein the power control value is data for controlling an operating clock of a graphic processing unit or an operating clock of the processor.

20. The electronic device of claim 17, wherein the predetermined power change level is a predetermined global power level, and
wherein the processor is further configured to compare the power level of the electronic device with the predetermined global power level when the application is executed, and to execute the application based on the power control information of the application when the power level of the electronic device is lower than the predetermined global power level.

21. The electronic device of claim 20, wherein the predetermined power change level further includes a local power level set by a user, and
wherein the processor is further configured to analyze an execution mode when the application is executed, to compare the power level of the electronic device with the predetermined global power level if the execution mode is an automatic mode, or compare the power level of the electronic device with the local power level if the execution mode is a manual mode, and to execute the application with the power control information of the application when the power level of the electronic device is lower than the predetermined global power level in the automatic mode or lower than the local power level in the manual mode.

22. The electronic device of claim 17, wherein the processor is further configured to execute the application with normal power data when the power level of the electronic device is a normal power level, and wherein the normal power data controls the screen display of the application with a power level not lower than the power control information does.

23. A second electronic device for controlling power of a plurality of first electronic devices, comprising:
   a communication interface;
   a memory; and
   a processor configured to:
   receive power change information of an application transmitted from the plurality of first electronic devices, in which an application installed is a same kind as the application;
   generate a power control information of the application based on the plurality of the power control values transmitted from the plurality of first electronic devices; and
   transmit the power control information to the plurality of first electronic devices,
   wherein the power change information comprises a power control value which controls a frame rate of a screen of the application set by a user of the plurality of first electronic devices.

24. The second electronic device of claim 23, wherein the first electronic device is a terminal, and the second electronic device is a server.

25. The second electronic device of claim 23, wherein power control information is an average value of the plurality of the power control values.

26. A non-transitory computer-readable storage medium recording thereon a program for executing operations of:
   transmitting, by an electronic device, power change information of an application to another electronic device;
   receiving and storing, by the electronic device, power control information of the application transmitted from the another electronic device; and
   if a power level of the electronic device is lower than a predetermined power change level when the application is executed, executing the application based on the power control information stored in the electronic device,
   wherein the power change information comprises a power control value which controls a frame rate of a screen of the application set by a user of the electronic device, and
   wherein the power control information is determined based on a plurality of power control values transmitted from a plurality of apparatuses, in which an application installed is a same kind as the application.

* * * * *